(12) United States Patent
Beyer et al.

(10) Patent No.: US 8,688,634 B2
(45) Date of Patent: Apr. 1, 2014

(54) ASYNCHRONOUS PEER-TO-PEER DATA REPLICATION

(75) Inventors: Kevin S. Beyer, San Jose, CA (US); Elizabeth B. Hamel, Morgan Hill, CA (US); Bruce G. Lindsay, San Jose, CA (US); Clarence M. Pruet, III, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 2240 days.

(21) Appl. No.: 10/788,556

(22) Filed: Feb. 27, 2004

(65) Prior Publication Data

US 2005/0193024 A1    Sep. 1, 2005

(51) Int. Cl.
  *G06F 17/00* (2006.01)
  *G06F 17/30* (2006.01)

(52) U.S. Cl.
  USPC .................................. 707/616; 707/999.203

(58) Field of Classification Search
  USPC ................. 707/201, 609, 611, 613, 616, 822, 707/999.201–999.203; 714/100
  See application file for complete search history.

(56) References Cited

U.S. PATENT DOCUMENTS

| | | | | |
|---|---|---|---|---|
| 4,620,276 A | * | 10/1986 | Daniell et al. | 709/201 |
| 4,631,673 A | * | 12/1986 | Haas et al. | 707/100 |
| 4,646,229 A | * | 2/1987 | Boyle | 707/203 |
| 4,648,036 A | * | 3/1987 | Gallant | 707/203 |
| 4,853,843 A | * | 8/1989 | Ecklund | 707/203 |
| 5,758,333 A |  | 5/1998 | Bauer et al. | |
| 5,787,247 A |  | 7/1998 | Norin et al. | |
| 5,791,769 A |  | 8/1998 | Yang | |
| 5,806,075 A | * | 9/1998 | Jain et al. | 707/999.201 |
| 5,832,514 A |  | 11/1998 | Norin et al. | |
| 5,884,324 A |  | 3/1999 | Cheng et al. | |
| 5,890,154 A |  | 3/1999 | Hsiao et al. | |
| 5,894,567 A |  | 4/1999 | Dodd et al. | |
| 5,916,307 A |  | 6/1999 | Piskiel et al. | |
| 5,920,860 A |  | 7/1999 | Maheshwari et al. | |
| 5,991,768 A |  | 11/1999 | Sun et al. | |
| 5,995,980 A |  | 11/1999 | Olson et al. | |
| 6,029,177 A |  | 2/2000 | Sadiq et al. | |
| 6,029,178 A |  | 2/2000 | Martin et al. | |
| 6,058,389 A |  | 5/2000 | Chandra et al. | |
| 6,058,401 A | * | 5/2000 | Stamos et al. | 707/201 |
| 6,061,689 A |  | 5/2000 | Chang et al. | |
| 6,067,541 A |  | 5/2000 | Raju et al. | |
| 6,073,140 A |  | 6/2000 | Morgan et al. | |
| 6,092,220 A |  | 7/2000 | Palmer et al. | |
| 6,105,017 A |  | 8/2000 | Kleewein et al. | |

(Continued)

FOREIGN PATENT DOCUMENTS

EP    0674260 B1    8/2002

OTHER PUBLICATIONS http://dbforums.com/arch/69/2002/12/634367 (see printout).

(Continued)

*Primary Examiner* — Marc Filipczyk
(74) *Attorney, Agent, or Firm* — Sawyer Law Group, P.C.

(57) ABSTRACT

A method and system for providing convergence of data copies in asynchronous data replication in a database system, includes: labeling rows, a copy of identification and propagation controls. In applying communicated changes, conflicting changes are identified and resolved. In this manner, convergence of data copies in asynchronous data replication is provided, and processing and storage costs are significantly reduced.

76 Claims, 17 Drawing Sheets

(56) References Cited

U.S. PATENT DOCUMENTS

| | | | |
|---|---|---|---|
| 6,122,630 A | 9/2000 | Strickler et al. | |
| 6,144,966 A | 11/2000 | Roberts | |
| 6,154,847 A | 11/2000 | Schofield et al. | |
| 6,202,149 B1 | 3/2001 | Hedegard | |
| 6,209,000 B1 | 3/2001 | Klein et al. | |
| 6,301,589 B1 | 10/2001 | Hirashima et al. | |
| 6,343,219 B1 | 1/2002 | Wada | |
| 6,353,834 B1 | 3/2002 | Wong et al. | |
| 6,412,017 B1 | 6/2002 | Straube et al. | |
| 6,438,558 B1 | 8/2002 | Stegelmann | |
| 6,446,144 B1 | 9/2002 | Habusha et al. | |
| 6,466,950 B1 | 10/2002 | Ono | |
| 6,490,595 B1 | 12/2002 | Candee et al. | |
| 6,526,417 B1 | 2/2003 | Perry | |
| 6,594,676 B1 | 7/2003 | Moore | |
| 6,615,223 B1 * | 9/2003 | Shih et al. | 707/201 |
| 6,622,152 B1 | 9/2003 | Sinn et al. | |
| 6,668,260 B2 | 12/2003 | Zoltan | |
| 6,738,082 B1 | 5/2004 | Dong et al. | |
| 6,865,160 B1 | 3/2005 | Bare | |
| 6,889,231 B1 | 5/2005 | Souder et al. | |
| 6,934,727 B2 | 8/2005 | Berkowitz et al. | |
| 6,973,463 B2 | 12/2005 | Merrells et al. | |
| 6,973,464 B1 | 12/2005 | Gao | |
| 6,976,022 B2 | 12/2005 | Vemuri et al. | |
| 6,993,539 B2 | 1/2006 | Federwisch et al. | |
| 7,003,531 B2 | 2/2006 | Holenstein et al. | |
| 7,031,974 B1 | 4/2006 | Subramaniam | |
| 7,069,295 B2 | 6/2006 | Sutherland et al. | |
| 7,072,911 B1 | 7/2006 | Doman et al. | |
| 7,076,481 B2 | 7/2006 | Osborne et al. | |
| 7,076,508 B2 | 7/2006 | Bourbonnais et al. | |
| 7,085,764 B2 | 8/2006 | Bangel et al. | |
| 7,203,687 B2 | 4/2007 | Adiba et al. | |
| 7,203,712 B2 | 4/2007 | Adiba et al. | |
| 7,240,054 B2 | 7/2007 | Adiba et al. | |
| 7,330,860 B2 | 2/2008 | Adiba et al. | |
| 7,398,285 B2 | 7/2008 | Kisley | |
| 7,490,083 B2 | 2/2009 | Bourbonnais et al. | |
| 7,685,569 B2 * | 3/2010 | Basheer | 717/123 |
| 2002/0049776 A1 | 4/2002 | Aronoff et al. | |
| 2002/0156761 A1 | 10/2002 | Chen et al. | |
| 2002/0165724 A1 | 11/2002 | Blankesteijn | |
| 2002/0188624 A1 | 12/2002 | Landin | |
| 2003/0041074 A1 | 2/2003 | Vasudevan et al. | |
| 2003/0154238 A1 | 8/2003 | Murphy et al. | |
| 2003/0177194 A1 | 9/2003 | Crocker et al. | |
| 2003/0182319 A1 | 9/2003 | Morrison | |
| 2003/0187857 A1 | 10/2003 | Ford | |
| 2003/0188035 A1 | 10/2003 | Lubbers et al. | |
| 2003/0208511 A1 | 11/2003 | Earl et al. | |
| 2004/0024771 A1 | 2/2004 | Jain et al. | |
| 2004/0162859 A1 | 8/2004 | Guo et al. | |
| 2004/0250032 A1 | 12/2004 | Ji et al. | |
| 2005/0102295 A1 | 5/2005 | Murray et al. | |
| 2005/0108621 A1 | 5/2005 | Kim et al. | |
| 2005/0114285 A1 | 5/2005 | Cincotta | |
| 2005/0149578 A1 | 7/2005 | Sustman et al. | |
| 2005/0193024 A1 | 9/2005 | Beyer et al. | |
| 2005/0193039 A1 | 9/2005 | Adiba et al. | |
| 2005/0193041 A1 | 9/2005 | Bourbonnais et al. | |
| 2005/0193093 A1 | 9/2005 | Mathew et al. | |
| 2005/0223163 A1 | 10/2005 | Ogasawara et al. | |
| 2005/0262055 A1 | 11/2005 | Newport | |
| 2006/0031286 A1 | 2/2006 | Sagawa | |
| 2006/0294333 A1 | 12/2006 | Michaylov | |
| 2007/0067313 A1 | 3/2007 | Garza et al. | |
| 2007/0083569 A1 | 4/2007 | Wong et al. | |
| 2007/0288537 A1 | 12/2007 | Bourbonnais et al. | |
| 2008/0098044 A1 | 4/2008 | Todd | |
| 2008/0163222 A1 | 7/2008 | Bourbonnais et al. | |
| 2009/0037398 A1 | 2/2009 | Horvitz et al. | |
| 2009/0132671 A1 | 5/2009 | Chkodrov et al. | |
| 2010/0161743 A1 | 6/2010 | Krishnamurthi et al. | |

OTHER PUBLICATIONS

Replication Components in IBM Replication Server, Kumar-Chatterjee, Enterprise Articles IBM, Aug. 2010.
http://dbforums.com/arch/69/2002/12/634367, 2002, 2 pages.
Berstein, Philip A. et al., "Context-based prefetch—an optimization for implementing objects on relations", VLDB Journal, 2000, pp. 177-189.
Carino, Jr., Felipe et al., "StorHouse Metanoia—New Applications for Database, Storage & Data Warehousing", Storage & Data Warehousing, 2001, pp. 521-531.
Gai, Lei et al., "Application Specific Data Replication for Edge Services", May 2003, ACM Press, pp. 449-460.
Georgakopoulos, Dimitrios et al., "Chronological Scheduling of Transactions with Temporal Dependencies", 1990, pp. 1-28.
Haritsa, Jayant R. et al., "Value-Based Scheduling in Real-Time Database Systems", VLDB Journal, 2 117-152, 1993, pp. 117-126.
Haskin, Roger et al., "Recovery Management in QuickSilver", Feb. 1988, ACM Press, vol. 6, issue 1, pp. 82-108.
Jennings, Roger, "SQL Server 2000 Gains on Oracle", Visual Basic Programmer's Journal, vol. 10, 2000, pp. 20-29.
Miled, Zina B., "Global Change Master Directory: Object-Oriented Active Asynchronous Transaction Management in a Federated Environment Using Data Agents", ACM 2001, pp. 207-214.
O'Connell, William et al., "Optimizer and Parallel Engine Extensions for Handling Expensive Methods Based on Large Objects", IEEE, 1999, pp. 304-313.
Pu, Calton et al., "Replica Control in Distributed Systems: An Asynchronous Approach", Apr. 1991, ACM Press, vol. 20, issue 2, pp. 377-386.
Stacey, Doug, "Replication: DB2, Oracle, or Sybase?", Dec. 1995, ACM Sigmod record, vol. 24, issue 4, pp. 95-101.
Wolanow, A., "One Enterprise, One Interface", Intelligent Enterprise, vol. 2, No. 4, Mar. 9, 1999, 1 page.
Yu, Haifeng et al., "Design and Evaluation of a Conit-Based Continuous Consistency Model for Replicated Services", ACM 2002, vol. 20, No. 3, pp. 239-282.
Interview Summary mailed Mar. 11, 2011 for U.S. Appl. No. 11/771,801; 4 pages.
Response to Final Office Action filed Mar. 29, 2011 for U.S. Appl. No. 11/771,801; 25 pages.
Notice of Allowance mailed Jun. 11, 2012 for U.S. Appl. No. 12/049,196; 15 pages.
Office Action mailed Jun. 20, 2012 for U.S. Appl. No. 13/437,198; 27 pages.
Response to Office Action filed Apr. 11, 2012 for U.S. Appl. No. 12/049,196; 12 pages.
Pre-Appeal Brief Conference Arguments filed Jun. 6, 2012 for U.S. Appl. No. 11/771,801; 5 pages.
Interview Summary mailed Mar. 2, 2012 for U.S. Appl. No. 11/771,801; 2 pages.
Office Action mailed Mar. 8, 2012 for U.S. Appl. No. 11/771,801; 16 pages.
Office Action mailed May 7, 2012 for U.S. Appl. No. 12/964,807; 22 pages.
USPTO U.S. Appl. No. 13/437,198, 1 page.

* cited by examiner

| | Copy A | Copy B |
|---|---|---|
| | //user insert<br>*ins X[1a] ---> m1 (301) | //user insert<br>*ins X[2b] ---> m2 (302) |
| | | //user delete<br>*del X[2b] ---> m3 (303) |
| | //insert conflict<br>m2 ---> implDel X[1a] ---> m4 (304)<br>       ins X[2b] (305) | |
| | //propagated delete<br>m3 ---> del X[2b] (306) | //propagated insert<br>m1 ---> ins X[1a] (307) |
| | | //propagated implicit delete<br>m4 ---> del X[1a] (308) |

| Copy A | Copy B | Copy C |
|---|---|---|
| //user insert<br>*ins X[1a] ---> m1 (401) | //user insert<br>*ins X[2b] ---> m2 (402) | |
| | | //insert from 'b'<br>m2 ---> ins X[2b] (403) |
| | | //user delete<br>*del X[2b] ---> m3 (404) |
| //delete conflict: 2b>1a<br>m3 ---> impleDel X[1a] ---> m4 (405)<br>deltomb add X[2b] (406) | //non-conflict delete from 'c'<br>m3 ---> del X[2b] (407) | |
| | //late arriving insert from 'a'<br>m1 ---> ins X[1a] (408) | //late arriving insert from 'a'<br>m1 ---> ins X[1a] (409) |
| //late arriving insert from 'b'<br>m2 ---> X[2b] in deltomb (410) | | |
| | //implicit delete from 'a'<br>m4 ---> del X[1a] (411) | //implicit delete from 'a'<br>m4 ---> del X[1a] (412) |

FIG. 4

| Copy A | Copy B | Copy C |
|---|---|---|
| //user insert<br>*ins X[1a] ---> m1 (501) | //user insert<br>*ins X[2b] ---> m2 (502) | |
| | | //insert from 'a'<br>m1 ---> ins X[1a] (503) |
| | | //user delete<br>*del X[1a] ---> m3 (504) |
| //non-conflict delete from 'c'<br>m3 ---> del X[1a] (505) | //delete conflict: 1a<2b<br>m3 ---> deltomb add X[1a] (506) | |
| //late arriving insert from 'b'<br>m2 ---> ins X[2b] (507) | | //late arriving insert from 'b'<br>m2 ---> ins X[2b] (508) |
| | | //user delete<br>*del X[2b] ---> m4 (509) |
| //non-conflict delete from 'c'<br>m4 ---> del X[2b] (510) | //non-conflict delete from 'c'<br>m4 ---> del X[2b] (511) | |
| | //late arriving insert from 'a'<br>m1 ---> X[1a] in deltomb (512) | |

FIG. 5

| Copy A | Copy B | Copy C |
|---|---|---|
| //user insert<br>*ins X[1a] ---> m1 (601) | | |
| | //propagated insert<br>m1 ---> ins X[1a] (602) | |
| | //user delete<br>*del X[1a] ---> m2 (603) | |
| //non-conflict delete from 'b'<br>m2 ---> del X[1a] (604) | | //delete conflict: not found<br>m2 ---> deltomb add X[1a] (605) |
| | | //late arriving insert from 'a'<br>m1 ---> X[1a] in deltomb (606) |

FIG. 6

```
If (log.tableId in CopyTables)
   switch (log.type)
      case Insert:
         if(log.new.CopyId==this Copy)
            sendInsertMsg (log.tableId,
               log.new.keyCols, log.new.nonKeyCols,
               log.new.Timestamp, log.new.CopyId);
      case Delete:
         if (log.old.CopyDelete=='N')
            sendDeleteMsg (log.tableId,
               log.old.keyCols,
               log.old.Timestamp, log.old.CopyId);
      case Update:
      case KeyUpdate:
         if (log.new.ImplicitDelete=='Y')
            sendDeleteMsg (log.tableId,
               log.old.keyCols,
               log.old.Timestamp, log.old.CopyId);
         if ((log.new.CopyDelete=='N') &&
            (log.new.CopyId==thisCopy))
         if (log.type==Update)
            sendUpdateMsg (log.tableId,
                log.new.keyCols, log.new.nonKeyCols,
                log.new.Timestamp, log.new.CopyId,
                log.old.Timestamp, log.old.CopyId);
         else
            sendKeyUpdMsg (log.tableId,
                log.new.KeyCols, Log.new.nonKeyCols,
                log.new.Timestamp, log.new.CopyId,
                log.old.KeyCols, log.old.Timestamp,
                log.old.CopyId);
```

FIG. 8

```
while (UCTtime() < delmsg.old.Timestamp)
    sleep (delmsg.Timestamp - UCTtime());  //wait for future
deleteConflict = reportConflict = FALSE; //default values
DECLARE delcur CURSOR FOR
    SELECT Timestamp, CopyId
    FROM delmsg.tableId target     -- the target table
    WHERE delmsg.keyCols = target.keyCols
    FOR UPDATE OF Timestamp, CopyId, CopyDelete, ImplicitDelete;
OPEN CURSOR delcur;
FETCH delcur INTO Timestamp, CopyId;
if (sqlcode == SQL_OK )
   ImplicitDeleteFlag='N';
   if ((Timestamp != delmsg.Timestamp) ||
      (CopyId != delmsg.CopyId))  //unmatched Timestamp
      deleteConflict = TRUE;
   if ((Timestamp <= delmsg.Timestamp) ||
      (Timestamp==delmsg.Timestamp)&& (CopyId<=delmsg.CopyId))
        //row time <= message time=>must delete row
   if ((CopyId == thisCopy)    &&
      (Timestamp!=delmsg.Timestamp || CopyId!=delmsg.CopyId))
        ImplicitDeleteFlag = 'Y';
   UPDATE delmsg.TableId
      SET ImplicitDelete = ImplicitDeleteFlag,
          CopyDelete = 'Y'       -- prevent capture
          Timestamp = '0001-01-01.01' -- prevent trigger
      WHERE CURRENT OF delcur;
   DELETE FROM delmsg.tableId
      WHERE CURRENT OF delcur;
   //row time>message time => don't delete row
   if (CopyId == this Copy)
      reportConflict = TRUE;
else // no row matched message row
   deleteConflict = TRUE;
   if (CopyId == thisCopy)
       reportConflict = TRUE;
   if (deleteConflict)
      if (delmsg.CopyId != thisCopy)
         INSERT INTO deltomb VALUES
            (delmsg.tableId, delmsg.keyCols,
             delmsg.Timestamp, delmsg.CpyId);
   if (reportConflict )
      logConflict ("DELETE", delmsg);
```

FIG. 9

```
while (UCTtime() < insmsg.new.Timestamp)
   sleep (insmsg.Timestamp - UCTtime());  //wait for future
   checkDeltomb = FALSE;   implDelete = 'N';
   // attempt a simple insert of the message row
   INSERT INTO insmsg.tableId VALUES
        (insmsg.keyCols, insmsg.nonKeyCols,
         insmsg.Timestamp, insmsg.CopyId);
   if (sqlcode == 'key violation')
       // fetch existing row for possible implicit delete
       DECLARE inscur CURSOR FOR
            SELECT Timestamp, CopyId
            FROM insmsg.tableId target
            WHERE insmsg.keyCols = target.keyCols
            FOR UPDATE OF nonKeyCols, "Timestamp", "CopyId";
       OPEN CURSOR inscur;
       FETCH inscur INTO Timestamp, CopyId;
       if (Timestamp < insmsg.Timestamp ||
           (Timestamp == insmsg.Timestamp &&
            CopyId < insmst.CopyId))
//Message row is winner. Implicit delete of existing row
            checkDeltomb = TRUE;
            if (CopyId == thisCopy)
                implDelete = 'Y';
            UPDATE insmsg.tableId
                SET nonKeyCols = insmsg.nonKeyCols,
                    Timestamp = insmsg.Timestamp,
                    CopyId = insmsg.CopyId,
                    ImplicitDelete = implDelete
                WHERE CURRENT OF inscur;
        else if (CopyId == thisCopy)
        // 'key violation' and existing row is the winner
            logConflict ("INSERT", insmsg);
   else // no 'key violation'
       checkDeltomb = TRUE;
```

FIG. 10

```
if (checkDeltomb)
    SELECT 1 FROM  deltomb
        WHERE tableId = insmsg.tableId
        AND   Timestamp = insmsg.Timestamp
        AND   CopyId = insmsg.CopyId
        AND   keyCols = insmsg.keyCols;
    if (sqlcode != 'no row found')
        // found a tombstone for the recieved row
        UPDATE insmsg.tableId
           SET CopyDelete = 'Y'       -- prevent capture
              Timestamp='0001-01-01.01'--prevent trigger
           WHERE keyCols = insmsg.keyCols;
        DELETE FROM insmsg.tableId
           WHERE keyCols = insmsg.keyCols;
```

FIG. 10 (continued)

```
while( UCTtime() < updmsg.new.Timestamp )
    sleep(updmsg.Timestamp - UCTtime()); //wait for future
checkDeltab = FALSE; implDel = 'N';
// Try for no conflict case
UPDATE updmsg.tableId
    SET nonKeyCols = updmsg.nonKeyCols,
        Timestamp = updmsg.new.Timestamp,
        CopyId = updmsg.new.CopyId,
        CopyDelete = 'N',
        ImplicitDelete = 'N'
    WHERE keyCols = updmsg.keyCols
    AND   Timestamp = updmsg.old.Timestamp
    AND   CopyId = updmsg.old.CopyId;
if (sqlcode == '1 row updated') // scenario 1: no conflict
    checkDeltomb = TRUE;
else // some kind of conflict, must look more closely
    //insert into deltomb if old CopyId not this copy
    if (updmsg.old.CopyId != thisCopy)
        INSERT INTO deltomb VALUES
        (updmsg.tableId, Updmsg.keyCols,
         updmsg.old.Timestamp, updmsg.old.CopyId);
    DECLARE updcur CURSOR FOR
        SELECT Timestamp, CopyId
        FROM updmsg.tableId
        WHERE keyCols = updmsg.KeyCols
        FOR UPDATE OF nonKeyCols, Timestamp, CopyId,
CopyDelete, ImplicitDelete;
    OPEN CURSOR updcur;
    FETCH updcur INTO Timestamp, CopyId;
    if (sqlcode == 'no rows found')
        // scenario 4: no matching key
        checkDeltomb = TRUE;
        INSERT INTO updmsg.tableId VALUES
            (updmsg.keyCols, updmsg.nonKeyCols,
             updmsg.new.Timestamp, updmsg.new.CopyId);
        else if(Timestamp < updmsg.new.Timestamp) ||
            (Timestamp == updmsg.new.Timestamp &&
             CopyId < updmsg.new.CopyId))
```

FIG. 11

```
    //scenario 2: new Timestamp > existing row
    checkDeltomb = TRUE;
    if (CopyId == thisCopy)
        implDelete = 'Y';
    UPDATE updmsg.tableId
        SET nonKeyCols = updmsg.nonKeyCols,
            Timestamp = updmsg.new.Timestamp,
            CopyId = updmsg.new.CopyId,
            ImplicitDelete = implDelete,
            CopyDelete = 'N'
        WHERE CURRENT OF updcur;
  else
    //scenario 3: new Timestamp< existing row
    if (CopyId == thisCopy)
        logConflict ("UPDATE", updmsg);
if( checkDeltomb )
    SELECT 1 FROM deltomb
        WHERE tableId = updmsg.tableId
        AND   Timestamp = updmsg.new.Timestamp
        AND   CopyId = updmsg.new.CopyId
        AND   keyCols = updmsg.keyCols;
    if( sqlcode != 'no rows found' )
        // found a tombstone for the new row
      UPDATE updmsg.tableId
          SET CopyDelete = 'Y',        -- prevent capture
              Timestamp = '0001-01-01.01'--prevent trigger
          WHERE keyCols = updmsg.keyCols;
      DELETE FROM updmsg.tableId
          WHERE keyCols = updmsg.keyCols;
```

FIG. 11 (continued)

| Copy A | Copy B | Copy C |
|---|---|---|
| //user insert<br>*ins X[1a] ---> m1 (1201) | | |
| //user update<br>*upd X[1a] -> X[2a] ---> m2 (1202) | //propagated insert from 'a'<br>m1 ---> ins X[1a] (1203) | |
| | //propagated update from 'a'<br>m2 ---> X[1a] -> X[2a] (1204) | |
| | //user delete<br>*del X[2a] ---> m3 (1205) | |
| //delete from 'b'<br>m3 ---> del X[2a] (1206) | | //delete conflict: not found<br>m3 ---> deltomb add X[2a] (1207) |
| | | //late arriving insert from 'a'<br>//no match in deltomb<br>m1 ---> ins X[1a] (1208) |
| | | //update from 'a': no conflict<br>m2 ---> X[1a] -> X[2a] (1209)<br>//X[2a] found in deltomb<br>del X[2a] (1210) |

FIG. 12

| Copy A | Copy B | Copy C |
|---|---|---|
| //user insert<br>*ins X[1a] ---> m1 (1301) | | //user insert<br>*ins X[2c] ---> m2 (1302) |
| | //insert from 'a'<br>m1 ---> ins X[1a] (1303) | |
| | //user update<br>*upd X[1a] -> X[3b] ---> m3 (1304) | |
| //update from 'b'<br>m3 ---> upd X[1a] -> X[3b] (1305) | | //update from 'b': 3b>2c<br>m3--> upd X[2c] -> X[3b] (1306)<br>deltomb add X[1a] (1307)<br>implDel X[2c] -> m4 (1308) |
| | | //late insert from 'a'<br>m1 ---> X[1a] in deltomb (1309) |
| | //user delete<br>*del X[3b] -> m5 (1310) | |
| //delete from 'b'<br>m5 -> del X[3b] (1311) | | //delete from 'b'<br>m5 -> del X[3b] (1312) |
| //late insert from 'c'<br>m2 -> ins X[2c] (1313) | //late insert from 'c'<br>m2 -> ins X[2c] (1314) | |
| //implDel from 'c'<br>m4 ---> del X[2c] (1315) | //implDel from 'c'<br>m4 ---> del X[2c] (1316) | |

FIG. 13

| Copy A | Copy B | Copy C |
|---|---|---|
| //user insert<br>*ins X[1a] ---> m1 (1401) | //user insert<br>*ins X[2b] ---> m2 (1402) | |
| | | //insert from 'b'<br>m2 ---> ins X[2b] (1403) |
| | | //user update<br>*upd X[2b] -> X[3c] ---> m3 (1404) |
| //update from 'c': 3b>1a<br>m3--> upd X[1a] -> X[3c] (1405)<br>   implDel X[1a] ---> m4 (1406)<br>   deltomb add X[2b] (1407) | //update from 'c'<br>m3 ---> upd X[2b] -> X[3c] (1408) | //user delete<br>*del X[3c] ---> m5 (1409) |
| //delete from 'c'<br>m5 ---> del X[3c] (1410) | //delete from 'c'<br>m5 --> del X[3c] (1411) | |
| //late insert from 'b'<br>m2 ---> X[2b] in deltomb (1412) | //late insert from 'a'<br>m1 ---> ins X[1a] (1413) | //late insert from 'a'<br>m1 ---> ins X[1a] (1414) |
| | //implicit delete from 'a'<br>m4 ---> del X[1a] (1415) | //implicit delete from 'a'<br>m4 ---> del X[1a] (1416) |

FIG. 14

| Copy A | Copy B | Copy C |
|---|---|---|
| //user insert<br>*ins X[1a] ---> m1 (1501) | | //user insert<br>*ins X[3c] ---> m2 (1502) |
| | //insert from 'a'<br>m1 ---> ins X[1a] (1503) | |
| | //user update<br>*upd X[1a] -> X[2b] ---> m3 (1504) | |
| //update from 'b'<br>m3--> upd X[1a] ---> X[2b] (1505) | //insert from 'c'<br>m2 ---> upd X[2b] -> X[3c] (1506)<br>    implDel X[2b] ---> m4 (1507) | //update from 'b': 2b<3c<br>m3 ---> deltomb add X[1a] (1508) |
| //insert from 'c'<br>m2 ---> upd X[2b] -> X[3c] (1509) | | //implDel from 'b'<br>m4 --> deltomb add X[2b] (1510) |
| //implDel from 'b'<br>m4 ---> deltomb add X[2b] (1511) | | //user delete<br>*del X[3c] ---> m5 (1512) |
| //delete from 'c'<br>m5 ---> del X[3c] (1513) | //delete from 'c'<br>m5 ---> del X[3c] (1514) | //late insert from 'a'<br>m1 ---> X[1a] in deltomb (1515) |

FIG. 15

| Copy A | Copy B | Copy C |
|---|---|---|
| //user insert<br>*ins X[1a] ---> m1 (1601) | | |
| | //insert from 'a'<br>m1 ---> ins X[1a] (1602) | |
| | //user update<br>*upd X[1a] -> X[2b] ---> m2 (1603) | |
| //update from 'b'<br>m2--> upd X[1a] ---> X[2b] (1604) | | //update from 'b': not found<br>m2 ---> ins X[2b] (1605)<br>    deltomb add X[1a] (1606) |
| | | //user delete<br>*del X[2b] ---> m3 (1607) |
| //delete from 'c'<br>m3 ---> del X[2b] (1608) | //delete from 'c'<br>m3 ---> del X[2b] (1609) | //late insert from 'a'<br>m1 ---> X[1a] in deltomb (1610) |

FIG. 16

ASYNCHRONOUS PEER-TO-PEER DATA REPLICATION

FIELD OF THE INVENTION

The present invention is related to the maintenance of multiple copies of tabular data.

More specifically, it relates to the asynchronous copying of data changes in one or more data copies to the other copies of the data.

BACKGROUND OF THE INVENTION

In a relational database management system, data is stored in a multiplicity of tables having a multiplicity of rows (records), the rows having a multiplicity of columns (fields). A subset of the columns is designated as key columns and the combination of values of the key columns of the rows of a single table must be distinct. It is frequently desirable to maintain copies of a table residing in a database of the relational database system in other databases in the system. Furthermore, it is desirable that changes (inserts, deletes, and updates) to rows in one table copy in the database be copied or replicated to the other table copies residing in the other databases.

The propagation of changes made to one table copy may be synchronous or asynchronous to the original change. Synchronous propagation makes changes at all table copies as part of the same transaction that initiated the original changes. Synchronous change propagation requires that the database management systems maintaining all or most table copies be active and available at the time of the change. Also, synchronous change propagation introduces substantial messaging and synchronization costs at the time of the original changes. Asynchronous propagation copies the original changes to the other table copies in separate transactions, subsequent to the completion of the transaction initiating the original changes. Thus, asynchronous change propagation is sometimes more desirable due to its savings in overhead costs.

The detecting of changes to be propagated asynchronously can be active or passive. Active change detection isolates the changes, at the time of the change, for later processing using database triggers or a similar mechanism. Passive change detection exploits information from the database recovery log, where changes are recorded for other purposes, to deduce what rows of which tables were changed as well as both the old and new values of changed columns. When changes are allowed to be initiated at any table copy, the system has been variously called "multi-master", "peer-to-peer", and "update anywhere" data replication.

However, asynchronous propagation of changes to any of the table copies introduces the possibility of conflicting changes, and the need for their resolution if the multiple table copies are to attain the same state. Some conventional solutions to the conflicting changes depend on a designated "master" copy at which conflicts are resolved. Other conventional solutions depend upon maintaining a history, or version vector, of change times for each copy of each row. Other conventional solutions do not insure that all copies of the table will converge to the same state.

Accordingly, there exists a need for a method and system for providing convergence of data copies in asynchronous data replication in a database system. The method and system should decrease the processing and storage costs, not require a designated "master" copy, not require that all table copies be simultaneously available at any time, ensure that all table copies will converge to a same state representing the most recent changes from any table copy, and/or report conflicting changes and how they are resolved. The present invention addresses such a need.

SUMMARY OF THE INVENTION

A method and system for providing convergence of data copies in asynchronous data replication in a database system, includes: labeling rows of a plurality of table copies with a monotonic number, a copy identification, and propagation controls; asynchronously capturing at least one labeled change to any row of any of the plurality of table copies from a database recovery log; determining that the captured change is to be communicated to others of the plurality of table copies; communicating the captured change to the others of the plurality of table copies; and applying the communicated change to the others of the plurality of table copies, where the plurality of table copies converge to a same state. In applying the communicated changes, conflicting changes are identified and resolved. In this manner, convergence of data copies in asynchronous data replication is provided, and processing and storage costs are significantly reduced.

BRIEF DESCRIPTION OF THE FIGURES

FIG. 2 illustrates an embodiment of a table copy row with the additional information in accordance with the present invention.

FIGS. 3 through 6 illustrate the need to propagate implicit deletes.

FIG. 8 illustrates pseudo-code for capturing and sending changes from one table copy to other table copies in accordance with the present invention.

FIG. 9 illustrates pseudo-code for applying a delete message to a table copy in accordance with the present invention.

FIG. 10 illustrates pseudo-code for applying an insert message to a table copy in accordance with the present invention.

FIG. 11 illustrates pseudo-code for applying a non-key update message to a table copy in accordance with the present invention.

FIGS. 12-16 illustrate examples of conflict cases when applying a non-key update message to a table copy in accordance with the present invention.

DETAILED DESCRIPTION

The present invention provides a method and system for providing convergence of data copies in asynchronous data replication in a database system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 16 in conjunction with the discussion below.

The System

Figure 1:
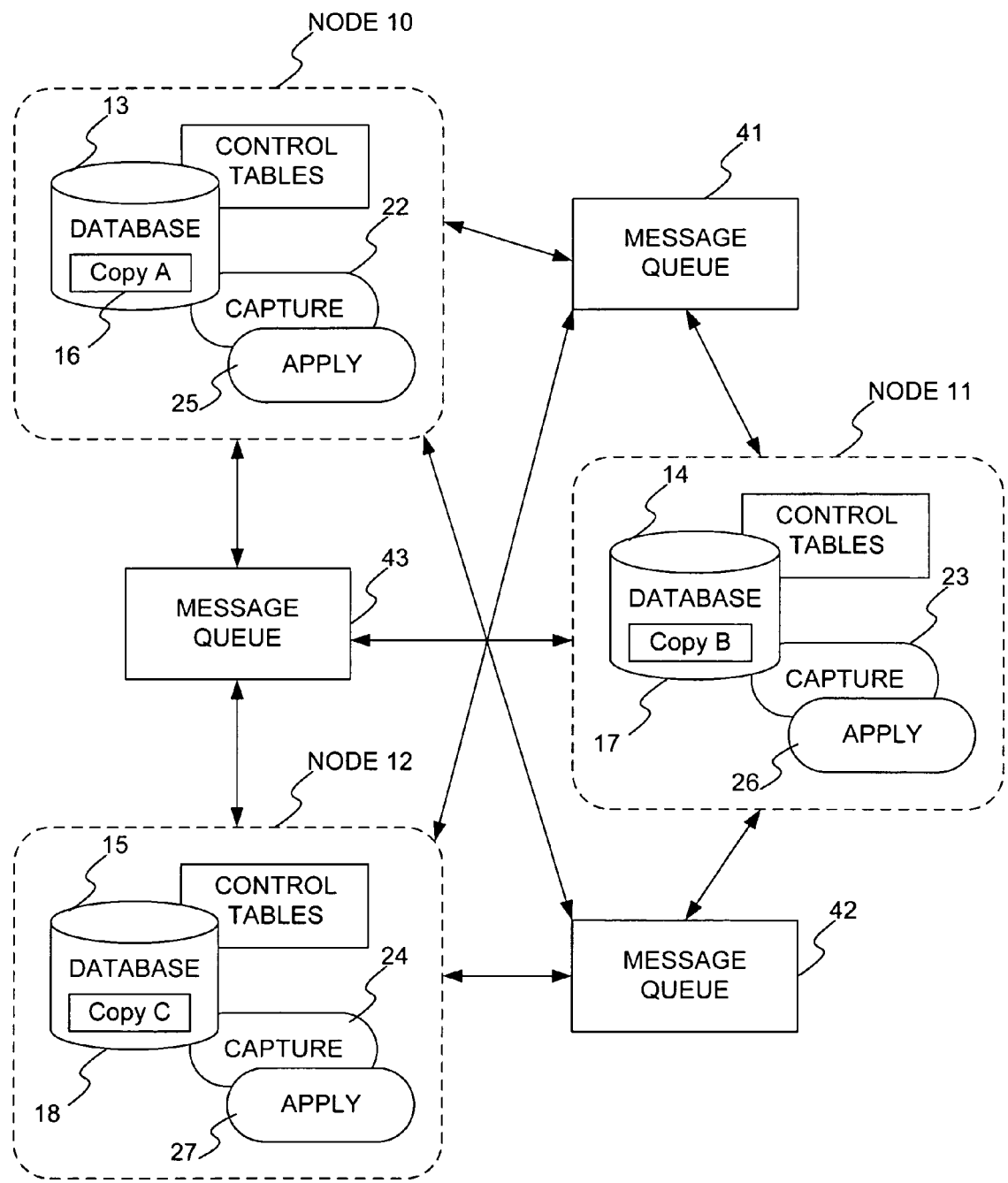
FIG. 1 illustrates an embodiment of a database system for the asynchronous data replication method in accordance with the present invention.

FIG. 1 illustrates an embodiment of a database system for the asynchronous data replication method in accordance with the present invention. In this embodiment, the tabular data whose changes are to be replicated to other copies reside in a Relational Database Management System (RDBMS) such as the DB2™ RDBMS product offered by the IBM Corporation™. However, it can also reside in other types of database systems. The system comprises a plurality of nodes 10-12. At each node is a database 13-15 comprising a table copy 16-18 (Copy A, Copy B, and Copy C), control tables 19-21 for the database, and capture 22-24 and apply 22-27 programs. The capture and apply programs 22-27 can operate externally from the database 13-15 using standard interfaces (e.g. SQL), or they may be embedded within the databases 13-15. The table copy at which changes are made is the "source table copy". The table copy at which the changes are to be replicated is the "target table copy". Any of the table copies can be a source table and a target table. Message queues 41-43 are used as the mechanism for transporting messages between the nodes 10-12. In this embodiment, the message queues 41-43 provide for message persistence and preserve the order of messages from a same source to a same target. Other types of message queues can also be used. Changes can be made at any of the table copies and replicated at the other table copies.

The database system maintains a recovery log at each database and provides a means to query its contents. Recovery log entries describe changes to rows of the table copies defined in the database. More specifically, entries in the recovery log contain information defining: (1) the table copy being changed, (2) the values of the key columns of the row being changed, (3) the old and new values of the columns of the changed row, and (4) the transaction (unit of work) containing the change. Recovery log entries for inserted rows contain only new column values while recovery log entries for deleted rows contain only old column values. Recovery log entries for updated rows contain the new and old values of the row columns changed. The order of entries in the recovery log reflects the order of change operations within each transaction and the order of transaction commit records reflects the order in which transactions were completed.

The recovery log records reflect at least the following copy operations: "delete", "insert", non-key "update", and "key update". Updates that do not modify any of the key columns are distinguished from those that do modify one or more of the key columns of a row due to the different conflicts that can occur, as described further below.

The capture program reads the recovery log for committed changes to a source table copy. These changes are then formatted into messages and sent one or more message queues to one or more target table copies. Upon delivery, the apply program retrieves the message and applies the changes to the target table copy, in the manner described in this specification.

Additional Information

Figures 2, 3:
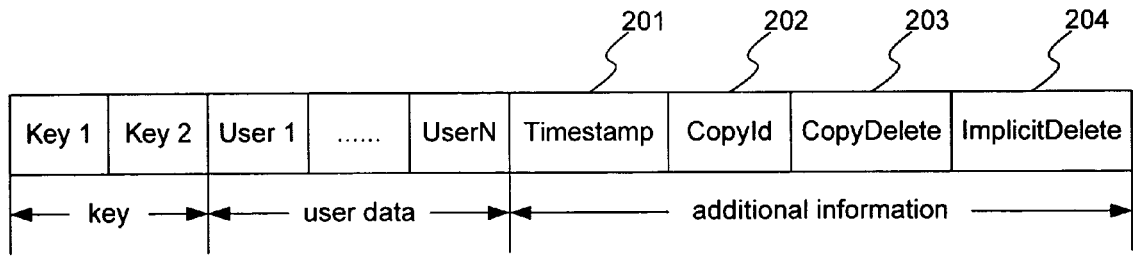

According to the present invention, each row of each table copy is augmented with additional information used to facilitate the convergence of replicated data. FIG. 2 illustrates an embodiment of a table copy row with the additional information in accordance with the present invention. The additional information comprises a Timestamp 201, a CopyId 202, CopyDelete flag 203, and an ImplicitDelete flag 204. Each of the additional information is further described below.

In this embodiment, each of the additional information 201-204 is illustrated as different columns in a table copy, however, one of ordinary skill in the art will understand that one or more of the additional information can be combined to optimize column level processing costs.

In this embodiment, each of the additional information 201-204 has a default value to which the database system will set the additional information unless otherwise instructed. Below is a set of example SQL statements to create columns for the additional information 201-204 and to set their default values:

```
ALTER TABLE <table name>
ADD COLUMN Timestamp TIMESTAMP DEFAULT '0001-01-01.00'
ADD COLUMN CopyId SMALLINT DEFAULT 0
ADD COLUMN CopyDelete CHAR(1) DEFAULT 'N'
ADD COLUMN ImplicitDelete CHAR(1) DEFAULT 'N';
```

In this embodiment, the additional information 201-204 is automatically maintained for user initiated changes while being explicitly maintained for copy system induced changes. To this end, database triggers can be employed to selectively set the additional information values when they are not explicitly set during row insert and update operations. Below is a set of example SQL statements illustrating the definitions of such database triggers:

```
CREATE TRIGGER CopyInsert
NO CASCADE BEFORE INSERT
ON <table name>
REFERENCING NEW AS new
FOR EACH ROW MODE DB2SQL
WHEN (new.CopyId = 0) – when CopyId is defaulted
BEGIN ATOMIC
    SET new.Timestamp = CURRENT TIMESTAMP – CURRENT TIMEZONE,
        new.CopyId = <this copy>,
        new.CopyDelete = 'N',
        new.ImplicitDelete = 'N';
END ATOMIC
CREATE TRIGGER CopyUpdate
NO CASCADE BEFORE UPDATE
ON <table name>
REFERENCING NEW AS new OLD AS old
FOR EACH ROW MODE DB2SQL
WHEN (new.Timestamp = old.Timestamp – when unchanged
        AND new.CopyId = old.CopyId)
BEGIN ATOMIC
    SET new.Timestamp = CURRENT TIMESTAMP – CURRENT TIMEZONE,
        new.CopyId = <this copy>,
        new.CopyDelete = 'N',
        new.ImplicitDelete = 'N';
END ATOMIC
```

Timestamp

The additional information includes a Timestamp 201 that records the time of the latest change to its row. In this embodiment, the Timestamp 201 is a non-decreasing time value generated using a local clock, where the time values are in a common time base for a plurality of table copies. It is a priority mechanism, used to automatically detect and resolve conflicting changes, as described later in this specification. Recording, in each row, the time an insert or update of the row occurs will make the time of the change available, via the recovery log, for change propagation. When two changes to a same row are detected to be in conflict, the change with the more recent timestamp dominates. Database triggers can be employed to automatically and transparently record the current time as the Timestamp 201 whenever a row is inserted or updated.

Care must be taken when processing timestamp values generated by different computer systems as the local clocks at the several systems may not be well synchronized. Of particular concern is the fact that the sequence of timestamp values is constrained to be monotonically increasing. Therefore, before applying a timestamp received from another computer system to a locally stored row, the application should be delayed until the local clock value exceeds the received timestamp value. The Timestamp value should have sufficient precision to distinguish multiple changes to a same row at a same table copy.

CopyId

The additional information further includes a CopyId 202 uniquely identifying the table copy at which the current value of the row was introduced, i.e., the source table copy. The CopyId 202 is used to prevent the propagation of the changes originating at a source table copy and replicated at target table copies from being treated as new changes at the target table copies and propagated again. If a table copy examines the CopyId 202 in one of its changed rows, and the CopyId in the row is the same as its own CopyId, then the change originated at the table copy and is propagated to the other table copies. If not, then the change is not propagated. Additionally, the CopyId 202 in a changed row can be used to break ties between the timestamps applied to changed rows from multiple local clocks. As with the Timestamp 201, database triggers can be employed to automatically set the CopyId of the changed rows.

CopyDelete Flag

The additional information further includes a CopyDelete flag 203, which indicates that the row is being deleted pursuant to a copy operation from another table copy. The CopyDelete flag 203 is used to prevent the propagation of a row delete to other copies from being treated as a new row delete and propagated again. In a delete row operation, the recovery log only has the CopyId that was in the deleted row before it was deleted. This CopyId by itself would not provide adequate propagation control for delete operations. Thus, the CopyDelete flag is needed to indicate whether or not the delete operation should be propagated to another table copy. When a row delete is performed by a user application at a source table copy, the default value of the CopyDelete flag 203 (not set) is left unchanged. Thus, when the delete operation is captured from the database recovery log, the delete is propagated to the other table copies. When applying a propagated delete, prior to deleting the row, the CopyDelete flag 203 in the target table copy row is set. Then, the row is deleted. The CopyDelete flag 203 becomes recorded in the database recovery log. In this way, when the delete operation is captured from the database recovery log at the target table copy, the set CopyDelete flag 203 indicates that this delete operation is not to be propagated.

ImplicitDelete Flag

The additional information further includes an ImplicitDelete flag 204, which indicates that the row is being implicitly deleted. Conflicting inserts are detected by the presence of a row with the same key column values already being present ('key violation' error), when attempting to insert a row from another table copy. The conflict is resolved by keeping the row with the higher timestamp. If the row existing in the table copy has the lower timestamp, it must be logically deleted and replaced by the received row. This is called an "implicit delete" of the existing row. Simply replacing implicitly deleted rows will not insure that all table copies converge to the same values. When a row is implicitly deleted, and its CopyId 202 is the CopyId assigned to the source table copy, all the other table copies must be notified of the implicit delete. Similarly, when applying a delete message, and the timestamp of the delete message is higher than the Timestamp 201 of the existing row, and the CopyId 202 of the existing row is the CopyId assigned to the target table copy, the ImplicitDelete flag 204 is set.

Examples of Propagation of Implicit Deletes

To illustrate the need to propagate implicit deletes, please refer to FIGS. 3 through 6 and their accompanying descriptions below. The diagrams use a "*" to denote user initiated changes. Thus, when the row key, Timestamp 201, and CopyId 202 are represented by "X[1a]", the "X" is the row key, the "1" is the Timestamp 201, and the "a" is the CopyId 202 for Copy A at Node 10 (FIG. 1). The type of change operation is represented by "ins" for inserts, "del" for deletes, and "implDel" for implicit deletes. An update will be represented in the form "X[1a]->X[2b]", where this represents an update of the row with key=X, Timestamp=1, and CopyId=a, to a row with key=X with timestamp=2 and CopyId=b. Message sends and receives are represented by "--->m1" and "m1--->", respectively, for the same message. All messages are sent to all other table copies.

In the example illustrated in FIG. 3, replication is performed between at least two table copies, Copy A and Copy B. The capture program at Copy A captures from the database recovery log a user insert of row X[1a] at Copy A, via operation 301. An insert message 'm1' is sent to the other table copies to propagate the insert. At Copy B, the capture program captures a user insert of row X[2b] at Copy B, via operation 302. An insert message 'm2' is sent to the other table copies to propagate the insert. The capture program at Copy B then captures a conflicting user delete of row X[2b] from Copy B, via operation 303. A delete message 'm3' is sent to the other table copies to propagate the delete. When Copy A receives the insert message 'm2', it results in an insert conflict with the current row X[1a]. Since the timestamp in the insert message 'm2' is greater than the timestamp in the current row (2b>1a), the current row X[1a] at Copy A is implicitly deleted, via operation 304, and the row X[2b] is inserted, via operation 305. According to the present invention, the implicit delete is then propagated with the sending of a delete message 'm4'. Copy A then receives the delete message 'm3' from Copy B and deletes row X[2b] from Copy A accordingly, via operation 306. Copy B receives the insert message 'm1' from Copy A and inserts row X[1a] into Copy B accordingly, via operation 307. Copy B then receives the delete message 'm4' and deletes row X[1a] from Copy B accordingly, via operation 308.

Note that if the delete message 'm4' was not sent in response to the conflict-induced implicit delete at Copy A, row X[1a] would remain in Copy B. The delete message 'm4' is sent from Copy A because the implicitly deleted row is at its "home" node, i.e., has CopyId=a. The sending of delete messages in response to implicit deletes at the home of the implicitly deleted row insures that a delete message will arrive at the other table copies after the corresponding insert message.

Conflicts can also occur for deleted rows resulting in the need to propagate the implicit deletes. A delete conflict occurs if the row key to be deleted is not present at the target table copy, or if the timestamp and CopyId of the target table copy of the row to be deleted does not match the timestamp and CopyId of the received deleted row. The detection of a delete conflict indicates that the state of the row at the source table copy is different from the state of the row at the target table copy. For example, an insert for the row to be deleted may not have yet arrived at the target table copy. If a deleted row cannot be precisely matched to a row in the target table copy, and the target table copy and the CopyId of the deleted row is not the CopyId assigned to the target table copy, the conflicting delete is remembered in a "delete tombstone" (placed in a Delete Tombstone table at the target table copy node), in case an insert for the deleted row should eventually arrive. Copied row inserts then check for matching, remembered delete conflict rows prior to applying the insert. If a matching delete tombstone is found, then the insert is rejected.

If the conflicting delete's timestamp is greater than the timestamp for an existing row with the same key, the existing row is deleted. This is also an implicit delete and, as is the case for insert conflicts, the implicit delete is propagated in accordance with the present invention to the other table copies.

FIG. 4 illustrates an example of a delete operation propagation where the deleted row timestamp in a delete message is greater than the timestamp in the existing row. This example involves change propagation between at least three table copies, Copy A, Copy B, and Copy C. The capture program at Copy A captures a conflicting user insert of row X[1a] into Copy A, via operation 401, and sends an insert message 'm1' to the other table copies to propagate the insert. The capture program at Copy B captures a user insert of row X[2b] into Copy B, via operation 402, and sends an insert message 'm2' to the other table copies to propagate the insert. Copy C receives the insert message 'm2' from Copy B, and inserts row X[2b] accordingly, via operation 403. The capture program at Copy C then captures a user delete of row X[2b] from Copy C, via operation 404, and sends a delete message 'm3' to the other table copies to propagate the delete. When Copy A receives the delete message 'm3' from Copy C, it results in a delete conflict since the timestamp for row X[1a] does not match the timestamp for row X[2b]. Since the timestamp in the delete message 'm3' is greater than the timestamp of the existing row (2b>1a), row X[1a] is implicitly deleted, via operation 405. Since the existing row's CopyId is the same as that assigned to Copy A, the implicit delete is propagated to the other table copies by sending a delete message 'm4' to the other table copies. Also, because the delete of row X[2b] is in conflict, the conflicting delete is remembered in a delete tombstone, via operation 406.

Copy B then receives the delete message 'm3' from Copy C and deletes row X[2b] accordingly, via operation 407. When Copy B receives the late arriving insert message 'm1' from Copy A, row X[1a] is inserted accordingly, via operation 408. Copy C also receives a late arriving insert message 'm1' from Copy A and inserts row X[1a] accordingly, via operation 409. Copy A receives a late arriving insert message 'm2' from Copy B, finds the matching delete tombstone for X[2b], and rejects the insert, via operation 410. Copy B receives the delete message 'm4' from Copy A and deletes row X[1a] at Copy B accordingly, via operation 411. Copy C also receives the delete message 'm4' from Copy A and deletes row X[1a] at Copy C accordingly, via operation 412.

Note that if the implicit delete at Copy A, caused by the delete of X[2b] at Copy C, was not propagated, the late arriving insert for X[1a] would survive at both Copy B and Copy C. Also note that the late arriving insert of X[2b] at Copy B would have been accepted at Copy A except for the delete tombstone entry caused by the conflicting delete of X[2b] at Copy C.

FIG. 5 illustrates an example of a delete operation propagation in accordance with the present invention, where the deleted row timestamp in the delete message is less than the timestamp in the existing row. The capture program at Copy A captures a user insert of row X[1a] into Copy A, via operation 501, and sends an insert message 'm1' to the other table copies to propagate the insert. The capture program at Copy B captures a conflicting user insert of row X[2b] into Copy B, via operation 502, and sends an insert message 'm2' to the other table copies to propagate the insert. Copy C receives the insert message 'm1' from Copy A, and inserts row X[1a] into Copy C accordingly, via operation 503. The capture program at Copy C captures a user delete of row X[1a] from Copy C, via operation 504, and sends a delete message 'm3' to the other table copies to propagate the delete.

Copy A then receives the delete message 'm3' from Copy C and deletes row X[1a] from Copy A accordingly, via operation 505. Copy B also receives the delete message 'm3', but here, it results in a delete conflict since row X[1a] cannot be found on Copy B. Since the timestamp in the delete message 'm3' is less than the timestamp in the existing row (1a<2b), the deletion of the row is rejected, and the delete of row X[1a] is remembered in a delete tombstone, via operation 506. Even though the delete message 'm3' for X[1a] does not cause the existing row to be deleted, a delete tombstone for the delete must be remembered because an insert message for row X[1a] may still arrive later.

Then, Copy A receives the late arriving insert message 'm2' from Copy B and inserts row X[2b] into Copy A accordingly, via operation 507. Copy C also receives the late arriving insert message 'm2' from Copy B and inserts row X[2b] into Copy C accordingly, via operation 508.

The capture program at Copy C then captures a user delete of row X[2b] from Copy C, via operation 509, and sends a delete message 'm4' to the other table copies to propagate the delete. Copy A receives the delete message 'm4' from Copy C and deletes row X[2b] from Copy A accordingly, via operation 510. Copy B also receives the delete message 'm4' and deletes row X[2b] from Copy B accordingly, via operation 511. Copy B then receives the late arriving insert message 'm1' from Copy A, finds a matching delete tombstone and rejects the insert, via operation 512.

FIG. 6 illustrates an example of a delete operation propagation in accordance with the present invention, where no existing row matching the key of the deleted row in the delete message is found. The capture program at Copy A captures a user insert of row X[1a] into Copy A, via operation 601, and sends an insert message 'm1' to the other table copies to propagate the insert. Copy B receives the insert message 'm1' from Copy A and inserts row X[1a] into Copy B accordingly, via operation 602. The capture program at Copy B captures a user delete of row X[1a] from Copy B, via operation 603, and sends a delete message 'm2' to the other table copies to propagate the delete. Copy A receives the delete message 'm2' from Copy B, and deletes row X[1a] from Copy A accordingly, via operation 604. Copy C also receives the delete message 'm2' from Copy B, but here, it results in a delete conflict since row X[1a] cannot be found on Copy C. The delete is thus remembered in a delete tombstone, via operation 605. When Copy C receives the late arriving insert message 'm1' from Copy A, it finds the matching delete tombstone for row X[1a] and rejects the insert, via operation 606. The conflicting delete at Copy C must be remembered (operation 605) to be able to suppress the late arriving insert message 'm1' from Copy A.

The Method

Figure 7:
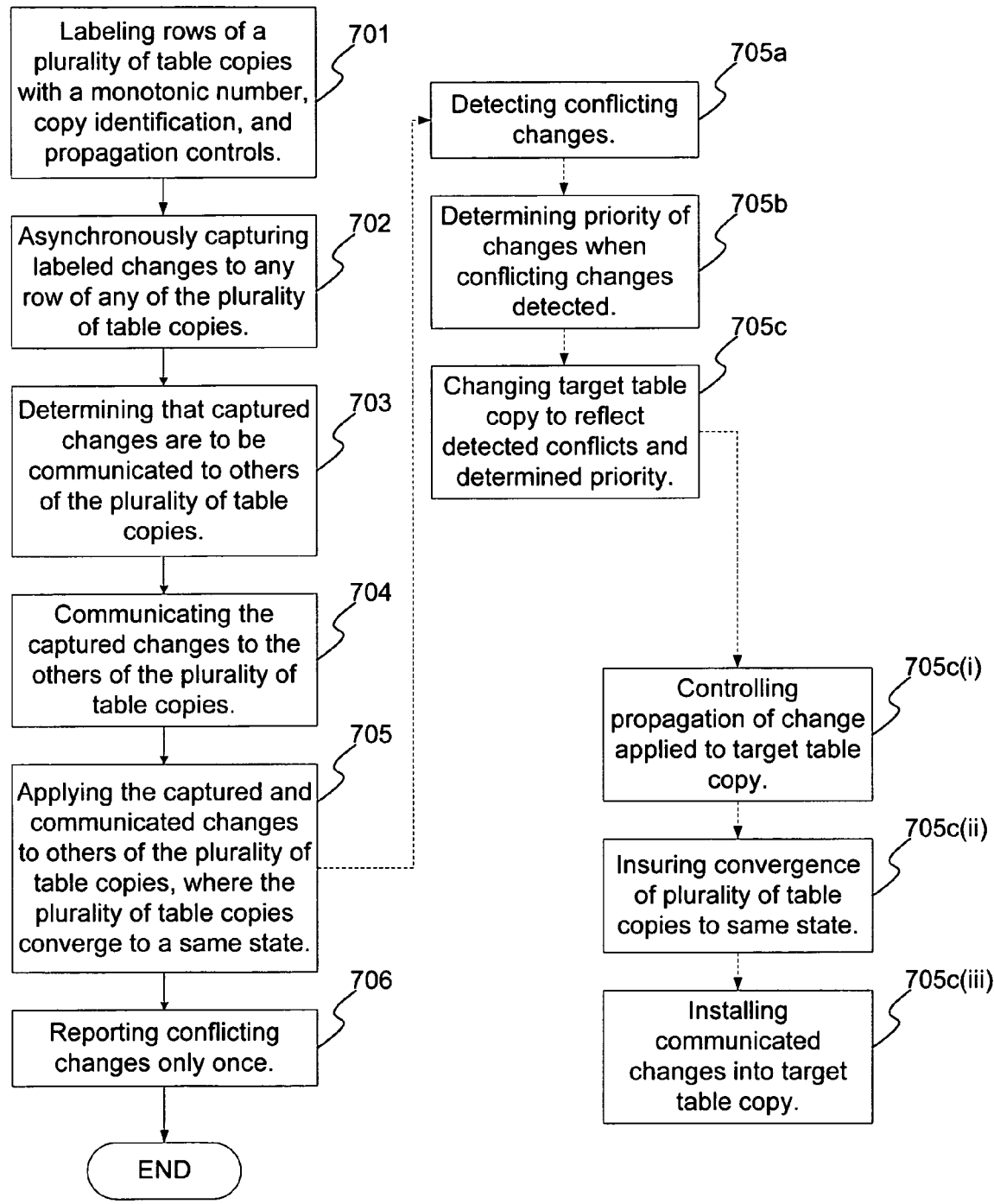
FIG. 7 is a flowchart illustrating a preferred embodiment of a method for providing convergence of data copies in asynchronous data replication in a database system in accordance with the present invention.

FIG. 7 is a flowchart illustrating a preferred embodiment of a method for providing convergence of data copies in asynchronous data replication in a database system in accordance with the present invention.

Labeling Step

First, the rows of a plurality of table copies are labeled with a monotonic number, copy identification, and propagation controls, via step 701.

Within an embodiment of the present invention, the monotonic number comprises using a local clock to generate non-decreasing time values, where the time values are in a common time base for the plurality of table copies. The monotonic number of the changed table copy is automatically applied in response to a user induced change. In the preferred embodiment, the monotonic number is the Timestamp 201, and is automatically applied using database triggers.

Different copy identification values are assigned to each of the plurality of table copies, where the copy identification value has an ordering property. The copy identification value of the changed table copy is automatically applied in response to a user induced change. In the preferred embodiment, the copy identification is the CopyId 202, and is automatically applied using database triggers.

The propagation controls comprise a delete label and a conflict label. The delete label indicates that a deleted row should not be communicated to the other table copies. The conflict label indicates that a row delete should be communicated to the other table copies. In the preferred embodiment, the delete label is the CopyDelete flag 203, and the conflict label is the ImplicitDelete flag 204.

Capturing Step

Next, labeled changes to any of the rows of the plurality of table copies are asynchronously captured, via step 702. The labeled changes at each database are captured by the capture program by accessing entries of the database recovery log. The type of change for each captured entry is then determined. The possible types include row 'insert', 'delete','non-key update',and 'key update'. The old and new column values of the changed rows are then extracted from the recovery log entries, including the old and new label column values. The extracted values further include changed and unchanged key column values.

Determining Step

Next, it is determined that the captured changes are to be communicated to others of the plurality of table copies, via step 703. In making this determination, the change type, copy identification, and propagation control values extracted from the database recovery log are examined. Then, the captured change is determined to be communicated in any of the following situations:

(1) the change type is a row insert and the copy identification for the captured change is the same as the copy identification assigned to the current table copy (i.e., the current table copy is the source table copy for the captured change), or (2) the change type is a row delete and the delete label of the captured change indicates that the change is to be communicated (CopyDelete flag is not set), or (3) the change type is a non-key update or key update and both the delete label and the conflict label of the captured change indicate that the captured change is to be communicated (CopyDelete flag is not set and ImplicitDelete flag is not set) and the new copy identification of the captured change is the same as the copy identification assigned to the current table copy (current table copy=source table copy).

(4) the change type is a delete, non-key update, or key update, and the conflict label (ImplicitDelete flag) of the captured change indicates that an implicit delete message is required, and a delete message for the old key value is to be communicated.

Communicating Step

Next, the captured changes are communicated to the others of the plurality of table copies, via step 704. The communicating comprises sending information reflective of the type of the captured change. In addition to the change type, the sent information includes:

(1) Row Insert: key column values, non-key column values, the monotonic number, and the copy identification;
(2) Row Delete: key column values, the monotonic number, and the copy identification;
(3) Non-Key Update: key column values, new non-key column values, the old monotonic number, the new monotonic number, the old copy identification, and the new copy identification; and
(4) Key Update: the old key column values, the new key column values, the new non-key column values, the old monotonic number, the old copy identification, and the new copy identification.

The capturing and sending of changes are described further later in this specification.

Applying Step

Returning to FIG. 7, next, the communicated changes are applied to the others of the plurality of table copies, where the plurality of table copies converge to the same state, via step 705. The application of the changes includes: detecting conflicting changes (step 705*a*), determining the priority of changes when conflicting changes are detected (step 705*b*), and changing the target table copy to reflect the detected conflicts and the determined priority (step 705*c*). The application includes the additional step of delaying the application until the local clock time value exceeds the monotonic number in the communicated change.

Detecting Conflicting Changes

A conflicting change is detected in the following cases:

(1) Row Delete: a conflict is detected if:
   (i) no row of the target table copy with key column values matching the key column values of the communicated changes is identified, or
   (ii) the monotonic number of a row of the target table copy with key column values matching the key column values of the communicated change does not match the monotonic number of the communicated change, or
   (iii) the copy identification of the row of the target table copy with key column values matching the key column values of the communicated changes does not match the copy identification of the communicated change.

Delete conflicts that cause an implicit delete at a table copy where the copy identification for the implicitly deleted row whose is the same as the copy identification assigned to the table copy, delete messages are sent to the other table copies. For all delete conflicts where the copy identification of the communicated change is not the same as the copy identification assigned to the table copy, a delete tombstone is recorded in a delete tombstone table.

(2) Row Insert: a conflict is detected if a row in the target table copy with key column values matching key column values of the communicated change is identified.

As with a delete message, the application of the insert message is delayed until the local time exceeds the Timestamp in the insert message. The insert of the row is first attempted. Rows inserted are checked for a corresponding delete tombstone from a previously processed conflicting delete. To avoid race conditions, the check for a delete tombstone should follow the insertion of the received row. If a matching delete tombstone is found, the newly inserted row is then deleted from the table copy. Those of ordinary skill in the art can find other means for checking for a matching delete tombstone than is illustrated here.

A conflicting insert will cause a 'key violation' error when attempting to insert the received row. If the conflicting insert row has a higher timestamp than the existing row in the target table copy, the existing row is replaced with the communicated row. Also, because the existing row is implicitly deleted, and the copy identification of the existing row is the same as the copy identification assigned to the target table copy, a delete message for the replaced row is sent to the other table copies. By setting the ImplicitDelete flag when replacing the existing row, the implicit delete is later captured from the database recovery log, resulting in the propagation of the delete;

(3) Non-Key Update: a conflict is detected if:
  (i) no row in the target table copy with key column values matching key column values of the communicated change is identified, or
  (ii) if a row is identified, the monotonic number of the identified row does not match the old monotonic number of the communicated change, or
  (iii) if a row is identified, the copy identification of the identified row does not match the old copy identification of the communicated change.
  Row updates conceptually comprise a logical delete, followed by a logical insert. Key and non-key updates are distinguished from each other because the conflict cases are different; and (4) Key Update: a conflict is detected if:
  (i) no row in the target table copy with key column values matching the old key columns of the communicated change values is identified, or
  (ii) if a row matching the old key column values of the communicated change is identified, the monotonic number of the identified row does not match the old monotonic number of the communicated change, or
  (iii) if a row matching the old key column values of the communicated change is identified, the copy identification of the identified row does not match the old copy identification of the communicated change, or
  (iv) a row in the target table copy with key column values matching the new key column values of the communicated change is identified.

Determining the Priority of Changes

The determining of priority of changes includes:
(1) No conflict detected: priority is assigned to the communicated change;
(2) Conflict detected and row insert type change: priority is assigned to the communicated changes, if the monotonic number of the communicated change is greater than the monotonic number of the conflicting row in the target table copy (or the monotonic numbers are equal and the copy identification of the communicated change is greater than the copy identification of the conflicting row); or
(3) Conflict detected and row delete type change: priority is assigned to the communicated change, if conflict detection identified no row matching the key column values of the communicated change, or the monotonic number of the communicated change is greater than the monotonic number of the conflicting row in the target table copy (or the monotonic numbers are equal and the copy identification of the communicated change is greater than the copy identification of the conflicting row); or
(4) Conflict detected and non-key update type change: priority is assigned to the communicated changes if conflict detection identified no row in the target table copy matching the key column values of the communicated change, or the monotonic number of the communicated change is greater than the monotonic number of the conflicting row in the target table copy (or the monotonic numbers are equal and the copy identification of the communicated change is greater than the copy identification of the conflicting row); or
(5) Conflict detected and key update type change: priority is assigned to the communicated changes, if:
  (i) no row in the target table copy matching the old key column values of the communicated change is identified, and
    (a) no row in the target table copy matching the new key column values of the communicated change is identified; or
    (b) the new monotonic number of the communicated change is greater than the monotonic number of the conflicting row with key column values matching the new key column values of the communicated change (or the monotonic numbers are equal and the copy identification of the communicated change is greater than the copy identification of the conflicting row in the target table copy with key column values matching the new key column values of the communicated change); or
  (ii) the old monotonic number of the communicated change is greater than the monotonic number of the conflicting row in the target table copy with key column values matching the old key column values of the communicated change (or the monotonic numbers are equal and the old copy identification of the communicated change is greater than the copy identification of the conflicting row), and
    (a) no row matching the new key column values of the communicated change is identified; or
    (b) the new monotonic number of the communicated change is greater than the monotonic number of the conflicting row with key column values matching the new key column values of the communicated change (or the monotonic numbers are equal and the new copy identification of the communicated change is greater than the copy identification of the conflicting row matching the new key column values of the communicated change).

Changing of the Target Table

The changing of the target table includes: controlling the propagation of the applied changes (step 705c(i)); insuring convergence of the plurality of table copies to the same state (step 705c(ii)); and installing the communicated changes into the target table copy (step 705c(iii)).

Controlling Communication of Applied Changes

The controlling of the propagation of the applied changes includes:
(1) Row Insert: setting the copy identification of the row inserted into the target table copy to the copy identification received with the communicated change;
(2) Row Delete: setting the delete label of the row to be deleted from the target table copy to indicate not to communicate the change and then deleting the target table row; and
(3) Non-Key or Key Update: setting the copy identification of the updated row in the target table copy to the copy identification received with the communicated change.

Insuring Convergence

To insure convergence, the changing of the target table copy includes:
(1) Applying a conflicting row insert assigned priority: insuring propagation of an implicit delete for the conflicting row by setting the conflict label, when a copy identification of the existing target table row is the same as the copy identification assigned to the target table copy;
(2) Applying a conflicting row delete assigned priority: insuring propagation of a row delete for the conflicting row by setting the conflict label, when a copy identification of the existing target table row is the same as the copy identification assigned to the target table copy;
(3) Applying conflicting delete and update: recording the communicated old key column values, the old monotonic number, and the old copy identification of the conflicting delete and update changes in a delete tombstone for the communicated old key, timestamp, and copy identification; and
(4) Applying conflicting insert and update: checking for matching delete tombstones for the communicated new key, timestamp, and copy identification, and suppressing the application of the communicated change when a matching delete tombstone is found.

Reporting Step

Once the captured and communicated changes are applied, the conflicting changes are reported, via step 706. Conflicts are reported so that users can respond to the possible loss of information corresponding to the rejected change(s). In general, conflicting changes will be detected and resolved at each of the table copies. Preferably, each conflict is reported only once.

The reporting of the conflicting changes includes:
(1) reporting conflicting communicated changes of the row delete, row insert, or non-key update type only when priority is not assigned to the communicated change and the copy identification of the conflicting row is the identification assigned to the target table copy; and
(2) reporting conflicting communicated changes of the key update type only when priority is not assigned to the communicated change, and the copy identification of the conflicting row with key column values matching the old key column values of the communicated change is the identification assigned to the target table copy, or the copy identification of the conflicting row with the key column values matching the new key column values of the communicated change is the identification assigned to the target table copy.

Capturing and Sending Changes

FIG. 8 illustrates pseudo-code for capturing and sending changes from one table copy to other table copies in accordance with the present invention. Throughout this specification, the pseudo-code is provided in the style of the C language with embedded SQL calls.

Changes to be sent to the other table copies are sent on the message queue 41-43 designated in the copy control tables for the table copy of the log record. For a row insert log record, an insert message containing the new key, non-key, Timestamp, and CopyId column values is sent only if the new CopyId is the CopyId assigned to the source table copy. For a delete log record, a delete message containing the old key, Timestamp, and CopyId column values is sent to the other table copies only if the old CopyDelete flag is not set (='N'). For an update or key update log record, no message is sent if the new CopyDelete flag is set (='Y'). If the new ImplicitDelete flag is set (='Y') in an update or key update log record, a delete message is sent containing the old key, Timestamp, and CopyId column values. Otherwise, for update log records, an update message containing the new key, new non-key, new and old Timestamp, and new and old CopyId column values is sent only if the new CopyId is the CopyId assigned to the source table copy. For key update log records, the old key column values are additionally included in a key update message.

Applying Delete Messages

FIG. 9 illustrates pseudo-code for applying a delete message to a table copy in accordance with the present invention. When a delete message is received, its application to the target table copy is first delayed until the local time exceeds the Timestamp in the delete message. To apply a delete, the CopyDelete flag of the row of the target table copy matching the key from the delete message is first set to prevent re-capturing and re-sending of the delete. If an implicit delete, the ImplicitDelete flag is additionally set. Then, after updating the row with the copy delete and possibly the ImplicitDelete flags, the row is deleted.

Recall that delete conflicts may cause an implicit delete, which is propagated to the other table copies, if the CopyId of the conflicting row is the same as the CopyId assigned to the target table copy, and that a delete tombstone is recorded in the delete tombstone table, if the old CopyId of the conflicting message row is not the same as the CopyId assigned to the target table copy. A delete conflict occurs if the delete message key column values cannot be matched to the key column values of a row of the target table copy, or the delete message Timestamp (and CopyId) do not match the row of the target table copy.

If the delete message Timestamp (and CopyId as tie breaker) is greater than the Timestamp (and CopyId) of the matching row of the target table copy, and the CopyId of the matching row is the same CopyId as that assigned to the target table copy, the row in the target table copy is implicitly deleted by not setting the CopyDelete flag before deleting the row itself. This will cause the implicit delete to be captured from the log and propagated to the other table copies.

If a delete conflict is detected, the conflict may need to be reported. The delete conflict is reported if (1) no matching row in the target table copy is found and the CopyId from the delete message is the CopyId assigned to the target table copy, or (2) a matching row is found, its Timestamp (and CopyId as tie breaker) is greater than the delete message Timestamp, and its CopyId is the CopyId assigned to the target table copy.

Applying Insert Messages

FIG. 10 illustrates pseudo-code for applying an insert message to a table copy in accordance with the present invention. A received insert message should not be processed before the local time exceeds the Timestamp in the insert message. Rows inserted are checked for a corresponding delete tombstone from a previously processed conflicting delete. The check for a delete tombstone should follow the insertion of the received row. If a matching delete tombstone is found, the newly inserted row is deleted from the target table copy.

A conflicting insert will cause a 'key violation' error when attempting to insert the received row. If the conflicting insert row has a higher Timestamp than the existing row in the target table copy, the existing row is replaced with the received row. Also, because the existing row is implicitly deleted, a delete message for the replaced row is sent to the other table copies if the CopyId of the existing row is the same as the CopyId assigned to the target table copy. By setting the ImplicitDelete flag when replacing the existing row, the implicit delete is propagated to the other table copies.

An insert conflict is reported if the existing row in the table copy has the higher Timestamp and its CopyId is the CopyId assigned to the target table copy.

Applying Non-Key Update Messages

FIG. 11 illustrates pseudo-code for applying a non-key update message to a table copy in accordance with the present invention. The application of a non-key update involves four possible cases: (1) the unchanged key of the updated row exists in the target table copy and it's Timestamp (CopyId) match the old Timestamp (CopyId) from the update message; (2) the unchanged key of the updated row exists in the target table copy and its Timestamp (CopyId) are less than the new Timestamp (CopyId) from the update message; (3) the unchanged key of the updated row exists in the target table copy and it's Timestamp (CopyId) are greater than the new Timestamp (CopyId) from the update message; and (4) the unchanged key of the updated row does not exist in the target table copy. Examples of each of these cases are set forth in FIGS. 12 through 16.

FIG. 12 illustrates an example of applying an update message where the unchanged key of the updated row exists in the target table copy and its Timestamp matches the old Timestamp from the update message. The capture program at Copy A captures a user insert of row X[1a] into Copy A, via operation 1201, and an insert message 'm1' is sent to the other table copies to propagate the insert. The capture program then captures a user update of row X[1a] at Copy A to row X[2a], via operation 1202, and an update message 'm2' is sent to the other table copies to propagate the update. Copy B receives the insert message 'm1' from Copy A and inserts row X[1a] in Copy B accordingly, via operation 1203. Copy B then receives the update message 'm2' from Copy A and updates row X[1a] at Copy B to row X[2a] accordingly, via operation 1204. Then, the capture program at Copy B captures a user delete of row X[2a] from Copy B, via operation 1205. Since the CopyDelete flag would not be set, a delete message 'm3' is sent to the other table copies to propagate the delete. Copy A receives the delete message 'm3' from Copy B, sets the CopyDelete flag in row X[2a], and deletes row X[2a] from Copy A accordingly, via operation 1206. Copy C also receives the delete message 'm3' from Copy B, but row X[2a] cannot be found on Copy C. Thus, the delete is remembered in a delete tombstone, via operation 1207. Copy C then receives the late arriving insert message 'm1' from Copy A. The delete tombstones are searched, but Copy C does not find a match. Thus, row X[1a] is inserted into Copy C, via operation 1208. Copy C then receives the late arriving update message 'm2' from Copy B and applies the update, via operation 1209. There are no conflicts in this case. A simple update of the non-key columns, Timestamp, and CopyId of the existing row in Copy C will suffice. However, because it is a logical insert of a new row, the delete tombstones for the new version of the updated row is searched. In this example, a matching delete tombstone for row X[2a] is found, and the row X[2a] is thus deleted from Copy C accordingly after setting the CopyDelete flag, via operation 1210. Otherwise, the late arriving insert message 'm1' and update message 'm2' would leave row X[2a] in Copy C.

FIG. 13 illustrates an example of applying an update message where the unchanged key of the updated row exists in the target table copy and its Timestamp is less than the Timestamp of the update message. The capture program at Copy A captures a user insert of row X[1a] into Copy A, via operation 1301, and sends an insert message 'm1' to the other table copies to propagate the insert. The capture program at Copy C captures a user insert of row X[2c] into Copy C, via operation 1302, and sends an insert message 'm2' to the other table copies to propagate the insert. Copy B receives the insert message 'm1' from Copy A and inserts row X[1a] into Copy B accordingly, via operation 1303. The capture program at Copy B then captures a user update of row X[1a] to row X[3b] from its recovery log, via operation 1304, and sends an update message 'm3' to the other table copies to propagate the update. Copy A receives the update message 'm3' from Copy B. There's no conflict so row X[1a] in Copy A is updated to row X[3b], via operation 1305. The update message 'm3' is also received by Copy C, however, there is a conflict since the timestamp in the row existing in Copy C does not match the old Timestamp in the update message 'm3', i.e., 3b>2c. Since the timestamp in the update message is greater than the Timestamp for the row existing on Copy C, the row is updated from X[2c] to X[3b], via operation 1306. However, there is a delete conflict for the old Timestamp of the updated row, so a delete tombstone is created for row X[1a], via operation 1307. If the old CopyId from the update message 'm3' had been the CopyId assigned to the target table copy, then the delete tombstone would not be created. Since the CopyId of the existing row is the CopyId assigned to Copy C, row X[2c] is implicated deleted with its ImplicitDelete flag set. This implicit delete of row X[2c] is propagated by a delete message 'm4', via operation 1308.

Next, Copy C receives the late insert message 'm1' from Copy A. The delete tombstone table is checked, and the delete tombstone for row X[1a] is found, via operation 1309. The insert of row X[1a] is thus rejected.

Next, Copy B captures a user delete of row X[3b] from Copy B, via operation 1310, and sends a delete message 'm5' to the other table copies to propagate the delete. Copy A receives the delete message 'm5' from Copy B and deletes row X[3b] from Copy A accordingly, via operation 1311. Copy C also receives the delete message 'm5' from Copy B and deletes row X[3b] from Copy C accordingly, via operation 1312.

Next, Copy A receives the late insert message 'm2' from Copy C. Row X[2c] is inserted into Copy A accordingly, via operation 1313. Similarly, Copy B receives the late insert message 'm2' from Copy C. Row X[2c] is inserted into Copy B accordingly, via operation 1314.

Next, Copy A receives the delete message 'm4' from Copy C propagating the implicit delete of row X[2c]. Row X[2c] is then deleted from Copy A accordingly, via operation 1315. Copy B also receives the delete message 'm4' from Copy C, and deletes row X[2c] from Copy B accordingly, via operation 1316.

FIG. 14 is an example illustrating the need for the delete tombstone in accordance with the present invention. The capture program at Copy A captures a user insert of row X[1a] into Copy A, via operation 1401, and sends an insert message 'm1' to the other table copies to propagate the insert. The capture program at Copy B captures a user insert of row X[2b] into Copy B, via operation 1402, and sends an insert message 'm2' to the other table copies to propagate the insert. Copy C receives the insert message 'm2' from Copy B, and inserts row X[2b] into Copy C accordingly, via operation 1403. The capture program at Copy C then captures a user update of row X[2b] to row X[3c], via operation 1404, and sends an update message 'm3' to the other table copies to propagate the update.

Copy A receives the update message 'm3' from Copy C. The Timestamp in the existing row X[1a] does not match the old Timestamp in the update message 'm3' (1a≠2b). Since the Timestamp in the update message 'm3' is greater than the Timestamp in the existing row in Copy A (3b>1a), row X[1a] in Copy A is updated to row X[3c], via operation 1405. The update involves the implicit delete of row X[1a] and the insert of row X[3c]. Before row X[1a] is deleted, its ImplicitDelete flag is set. Thus, when the capture program at Copy A captures the delete of row X[1a], a delete message 'm4' is sent to the other table copies to propagate the implicit delete of row X[1a], via operation 1406. The delete of row X[2b] is also remembered in a delete tombstone, via operation 1407.

Copy B also receives the update message 'm3' from Copy C. Here, there is no conflict, so row X[2b] in Copy B is updated to row X[3c], via operation 1408. The capture program at Copy C then captures a user delete of row X[3c] from Copy C (CopyDelete flag not set), via operation 1409, and sends a delete message 'm5' to the other table copies to propagate the delete. Copy A receives the delete message 'm5' from Copy C. There is no conflict, so row X[3c] is accordingly deleted from Copy A (CopyDelete flag not set), via operation 1410. Copy B also receives the delete message 'm5' from Copy C, and deletes row X[3c] from Copy B (CopyDelete flag set), via operation 1411.

Copy A then receives the late insert message 'm2' from Copy B. The delete tombstone matching row X[2b] is found, and the insert is rejected, via step 1412. Copy B receives the late insert message 'm1' from Copy A, and inserts row X[1a] into Copy B, via operation 1413. Copy C also receives the late insert message 'm1' from Copy A, and inserts row X[1a] into Copy C, via operation 1414. Copy B then receives the delete message 'm4' from Copy A, and deletes row X[1a] from Copy B (CopyDelete flag set, ImplicitDelete flag not set), via operation 1415. Similarly, Copy C receives the implicit delete message 'm4' from Copy A, and deletes row X[1a] from Copy C (CopyDelete flag set, ImplicitDelete flag not set), via operation 1416.

If the delete tombstone was not placed by update message 'm3' at Copy A (operation 1407), the late arriving insert message 'm2' from Copy B would result in the row X[2b] being inserted into Copy A. If the implicit delete caused by update message 'm3' at Copy A was not propagated, the late arriving insert message 'm1' at Copy B and Copy C would cause row X[1a] to remain in the copies.

FIG. 15 illustrates an example of applying an update message where the unchanged key of the updated row exists in the target table copy and its Timestamp is greater than the new Timestamp for the update message. The capture program at Copy A captures a user insert of row X[1a] into Copy A, via operation 1501, and sends an insert message 'm1' to the other table copies to propagate the insert. The capture program at Copy C captures a user insert of row X[3c] into Copy C, via operation 1502, and sends an insert message 'm2' to the other table copies to propagate the insert. Copy B receives the insert message 'm1' from Copy A and inserts row X[1a] into Copy B accordingly, via operation 1503.

The capture program at Copy B captures a user update of row X[1a] to row X[2b], via operation 1504, and sends an update message 'm3' to the other table copies to propagate the update. Copy A receives the update message 'm3' from Copy B and updates row X[1a] in Copy A to row X[2b] accordingly, via operation 1505. Copy C also receives the update message 'm3' from Copy B. However, there is a conflict. The Timestamp in the existing row in Copy C does not match the old Timestamp in the update message 'm3' (3c≠2b).

Since the new Timestamp in the update message is less than the Timestamp in the existing row (2b<3c), both the delete and the insert in the update are rejected, and a delete tombstone is created for row X[1a], via operation 1508. If the existing row's CopyId is the CopyId assigned to Copy C, the conflict can be reported.

Copy B receives the insert message 'm2' from Copy C. Row X[2b] in Copy B is updated to row X[3c] accordingly, via operation 1506. In applying the update, row X[2b] is implicitly deleted, via operation 1507. The ImplicitDelete flag in row X[2b] is set prior to its deletion. When the capture program at Copy B captures the implicit delete, it sends delete message 'm4' to the other table copies to propagate the implicit delete.

Copy A then receives the insert message 'm2' from Copy C, and updates row X[2b] to row X[3c], via operation 1509. Copy C receives the delete message 'm4' from Copy B. Since row X[2b] does not exist in Copy C, a delete tombstone is created for it, via operation 1510. Copy A also receives the delete message 'm4' from Copy B. Since row X[2b] also does not exist on Copy A, a delete tombstone is created for it, via operation 1511.

The capture program at Copy C then captures a user delete of row X[3c] (CopyDelete flag not set), via operation 1512, and sends a delete message 'm5' to the other table copies to propagate the delete. Copy A receives the delete message 'm5' from Copy C, and deletes row X[3c] from Copy A (CopyDelete flag set), via operation 1513. Copy B also receives the delete message 'm5' from Copy C, and deletes row X[3c] from Copy B (CopyDelete flag set), via operation 1514. Copy C receives the late insert message 'm1' from Copy A. The delete tombstone matching row X[1a] is found, and the insert of row X[1a] is rejected, via operation 1515. Had the update message 'm3' not created the tombstone for X[1a] (operation 1508), the late arriving insert message 'm1' from Copy A would have caused row X[1a] to be inserted into Copy C.

FIG. 16 illustrates an example of applying an update message where the unchanged key of the updated row does not exist in the target table copy. The capture program at Copy A captures a user insert of row X[1a] into Copy A, via operation 1601, and sends an insert message 'm1' to the other table copies to propagate the insert. Copy B receives the insert message 'm1' from Copy A, and inserts row X[1a] into Copy B, via operation 1602. The capture program at Copy B then captures a user update of row X[1a] to row X[2b], via operation 1603, and an update message 'm2' is sent to the other table copies to propagate the update.

Copy A receives the update message 'm2' from Copy B, and updates row X[1a] at Copy A to row X[2b], via operation 1604. Copy C also receives the update message 'm2' from Copy B, but the old row X[1a] is not found in Copy C. Row X[2b] is inserted into Copy C, via operation 1605. But since there is a logical delete conflict for the old row X[1a] from the update message 'm2', a delete tombstone is created for row X[1a], via operation 1606. A delete tombstone for the new row X[2b] is also searched, but no match is found. At Copy C, the conflict is reported.

The capture program at Copy C captures a user delete of row X[2b] from Copy C (CopyDelete flag not set), via operation 1607, and a delete message 'm3' is sent to the other table copies to propagate the delete. Copy A receives the delete message 'm3' from Copy C, and deletes row X[2b] from Copy A accordingly (CopyDelete flag set), via operation 1608. Copy B also receives the delete message 'm3' from Copy C, and deletes row X[2b] from Copy B (CopyDelete flag set), via operation 1609. Copy C receives the late insert message 'm1' from Copy A, finds the delete tombstone for row X[1a] and rejects the insert, via operation 1610.

Applying Key Update Messages

Changes that update the key of a row introduce many new possibilities for conflicts when applying the change to other, asynchronously updated table copies. Since two different row keys are involved (the old key and the new key), the target table copy may find conflicts on either or both of the keys of the key update change.

The key update is modeled as a deletion of the row with the old key and an insertion of a row with the new key. There are many cases to consider. The old key and old Timestamp (+old CopyId) from the key update message may (1) match the key and Timestamp (+CopyId) of an existing row in the target table copy [old=copy], (2) match the key but old Timestamp (+old CopyId) is greater than the Timestamp (+CopyId) of an existing row in the target table copy [old>copy], (3) match the key but the old Timestamp (+old CopyId) is less than the Timestamp (+CopyId) of an existing row in the target table copy [old<copy], or (4) not match any key of the target table copy [no old].

The new key and new Timestamp (+new CopyId) from the key update message may (1) not have a matching row in the target table copy [no new], (2) match an existing row in the target table copy with Timestamp less then the new Timestamp (+new CopyID from the Key Update message [new>copy], or (3) match an existing row in the target table copy with Timestamp greater than the new Timestamp (+newCopyId) from the Key Update message [new<copy]. Thus, there are twelve possible cases for the combinations of the old and new keys in a key update operation.

Case 1: [old=copy, no new] This is the no conflict case. The key and non-key columns of the old key's row are updated without worrying about implicit deletes or creating delete tombstones. A delete tombstone for the new key and Timestamp, however, is checked.

Case 2: [old>copy, no new] This case results in a delete conflict and an implicit delete of the existing row in the target table copy. A delete tombstone for the old key with old Timestamp and old CopyId is created if the old CopyId is not the CopyId assigned to the target table copy, and the implicit delete is propagated if the existing row's CopyId is the CopyId assigned to the target table copy. A delete tombstone for the new key and Timestamp is also checked. The conflict in this case is not reported.

Case 3. [old<copy, no new] A delete conflict results, so a delete tombstone for the old key, old Timestamp and old CopyId is created, unless the old CopyId is the CopyId assigned to the target table copy. But, the existing row in the target table copy dominates the row that was updated, so the existing row in the target table copy cannot be deleted. A row with the new key, Timestamp, and CopyId is inserted, and the delete tombstones are checked for a match. A conflict is reported if the CopyId of the existing row is the CopyId assigned to the target table copy. Note that in this conflict, both old and new rows exist at the target table copy and eventually at all copies.

Case 4: [no old, no new] The old key has a delete conflict, so a delete tombstone is created if the old CopyId is not the CopyId assigned to the target table copy. The new key can be inserted and checked against the delete tombstones. If the CopyId of the old key is the CopyId assigned to the target table copy, the delete conflict is reported.

Case 5. [old=copy, new>copy] There is no conflict for the delete of the old key. There is an implicit delete for the new key and the ImplicitDelete flag is set when updating the new key row, if the new row CopyId is the CopyId assigned to the target table copy. The delete of the old key is not propagated, i.e., set the CopyDelete flag before deleting. The delete tombstones are checked for the new key. The conflict report is not reported.

Case 6. [old>copy, new>copy] There is a delete conflict for the old key and an insert conflict for the new key. The row of the old key is implicitly deleted and the ImplicitDelete flag is set if the CopyId of the existing old key row is the CopyId assigned to the target table copy and the CopyDelete flag is set. Also a delete tombstone for the old key is created, if the old CopyId is not the same as the CopyId assigned to the target table copy. The row of the new key is also implicitly deleted and the ImplicitDelete flag is set when updating the new key if the CopyId of the new key's row is the CopyId assigned to the target table copy. Delete tombstones are checked for the new key. The conflict is not reported.

Case 7: [old<copy, new>copy] There is a delete conflict on the old key's row, but the row is not deleted because its Timestamp is greater than the old Timestamp from the key update message. A delete tombstone for the old key and old Timestamp from the key update message is created. The new key's row in the target table copy is implicitly deleted and the ImplicitDelete flag is set, if the new row's CopyId is the CopyId assigned to the target table copy, and the tombstones are checked for the new key and new Timestamp. The conflict is reported if the old key's row in the target table copy has the CopyId assigned to the target table copy. Like Case 3, both the old and new key rows will existing in the target table copy.

Case 8: [no old, new>copy] There is a delete conflict on the old key whose row is missing from the target table copy, so a delete tombstone is created. The new key's row in the target table copy is implicitly deleted and the ImplicitDelete flag is set, if the new row's CopyId is the CopyId assigned to the target table copy, and the delete tombstones are checked for the new key and new Timestamp. The conflict is reported if the CopyId of the old key in the Key Update message is the CopyId assigned to the target table copy.

Case 9: [old=copy, new<copy] There is no conflict in deleting the old key row from the target table copy. The new key's row in the target table copy dominates the new key in the key update message, so the new key's row is not updated. A conflict is reported if the CopyId of the new key's row in the target table copy is the CopyId assigned to the target table copy.

Case 10. [old>copy, new<copy] There is a delete conflict for the old key with the Timestamp from the key update message dominating. The ImplicitDelete flag is set if the old row's CopyId is the CopyId assigned to the target table copy. So the old key's row in the target table copy will be deleted, and a delete tombstone for the old key and old Timestamp from the key update message is created. The new key's row in the target table copy is not updated. The conflict is reported if the CopyId of the new key's row in the target table copy is the CopyId assigned to the target table copy.

Case 11: [old<copy, new<copy] Both the new and old key conflict with the target table copy. But, neither dominate the rows in the target table copy, so the target table copy is not updated. A delete tombstone for the old key and old Timestamp from the key update message is created. The conflict is reported if the CopyId of the old key's row in the target table copy or CopyId of the new key's row in the target table copy is the CopyId assigned to the target table copy.

Case 12: [no old, new<copy] Again, both the old and new keys conflict with the target table copy, but no updates to the target table copy are needed. A delete tombstone for the old key and old Timestamp from the key update message is created. The conflict is reported if the old CopyId from the Key update message or the CopyId of the existing new key row in the target table copy is the CopyId assigned to the target table copy.

The following table summarizes the application of key update messages in accordance with the present invention.

|  | No New | New > Copy | New < Copy |
|---|---|---|---|
| Old = Copy | UPDATE old row key & non-key columns check deltomb (new key, new Timestamp) | DELETE old row (set CopyDelete) UPDATE new row (non-key columns) implDel if CopyId check deltomb (new key, new Timestamp) | DELETE old row (set CopyDelete) report if new key CopyId |
| Old < Copy | UPDATE old row key & non-key columns implDel if CopyId insert deltomb (old key, old Timestamp) check deltomb (new key, new Timestamp) | DELETE old row implDel if CopyId insert deltomb (old key, old Timestamp) UPDATE new row (non-key cols) implDel if CopyId check deltomb (new key, new Timestamp) | DELETE old row (implDel if CopyId) insert deltomb (old key, old Timestamp) report if new key CopyId |
| Old > Copy | insert deltomb (old key, old Timestamp) INSERT new row check deltomb (new key, new Timestamp) report if old key row CopyId | insert deltomb (old key, old Timestamp) UPDATE new row (non-key columns) implDel if CopyId check deltomb (new key, new Tombstone) report if old key row CopyId | insert deltomb (old key, old Timestamp) report if old key CopyId report if new key CopyId |
| No Old | insert deltomb (old key, old Timestamp) INSERT new row check deltomb (new key, new Timestamp) report if old CopyId | insert deltomb (old key, old Timestamp) UPDATE new row (non-key columns) implDel if CopyId check deltomb (new key, new Timestamp) report if upd old CopyId | insert deltomb (old key, old Timestamp) report if old key CopyId report of new key CopyId |

A method and system for providing convergence of data copies in asynchronous data replication in a database system has been disclosed. The present invention labels rows of a plurality of table copies with a monotonic number, a copy identification, and propagation controls; asynchronously captures at least one labeled change to any row of any of the plurality of table copies from a database recovery log; determines that the captured change is to be communicated to others of the plurality of table copies; communicates the captured change to the others of the plurality of table copies; and applies the communicated change to the others of the plurality of table copies, wherein the plurality of table copies converge to a same state. In applying the communicated changes, conflicting changes are identified and resolved. In this manner, convergence of data copies in asynchronous data replication is provided without requiring a "master" copy or that all table copies be simultaneously available at any time. The processing and storage costs in the method and system is significantly reduced.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for providing convergence of multiple copies of a table to a same state in a database system, the database system including a plurality of nodes each having a corresponding copy of the table, the method comprising:

for each row of each table copy,
associating and storing a timestamp in the table copy with the row, the timestamp indicating a time when a change to the row has occurred;
associating and storing a copy identification in the table copy with the row, the copy identification being an identifier that uniquely identifies the table copy to which the row belongs; and
associating and storing propagation controls in the table copy with the row, the propagation controls indicating whether a change to the row should be communicated to other table copies based at least in part on the timestamp of the change or the copy identification associated with the row, wherein the propagation controls comprise a delete label and a conflict label, wherein the delete label indicates that a row delete in a given table copy is not to be communicated to other table copies in the database system;
asynchronously capturing a change to a row of a given table copy from a database recovery log, the database recovery log containing an entry that describes the change to the row of the given table copy;
determining that the captured change to the row of the given table copy is to be communicated to other table copies in the database system, the determination being made in accordance with the indication of the propagation controls associated with the changed row of the given table copy;

communicating the captured change to the other table copies in the database system; and applying the communicated change to the other table copies in the database system, wherein each table copy in the database system converges to a same state, wherein applying the communicated change includes:

detecting a conflict for the communicated change with a row of a target table copy, the target table copy being a table copy among the other table copies in the database system at which changes are to be replicated;

determining a priority for the communicated change responsive to the conflict being detected; and changing the row of the target table copy in accordance with the detected conflict and the determined priority for the communicated change by controlling propagation of the change applied to the target table copy, by insuring convergence of each table copy in the database system to the same state, and by installing the communicated change into the target table copy.

2. The method of claim 1, wherein the timestamp comprises a monotonic number having a non-decreasing time value, wherein the time values for each table copy are in a common time base.

3. The method of claim 2, wherein associating and storing a timestamp with the row includes associating and storing the timestamp with the row in response to a user induced change of the row.

4. The method of claim 1, wherein the copy identification uniquely identifying each table copy has an ordering property.

5. The method of claim 4, wherein associating and storing a copy identification with the row includes associating and storing the copy identification with the row in response to a user induced change of the row.

6. The method of claim 1, wherein the conflict label indicates that an implicit row delete in a given table copy is to be communicated to other table copies in the database system, an implicit row delete being a deletion of a row due to a conflict.

7. The method of claim 1, wherein asynchronously capturing a change to a row of a given table copy comprises:

accessing the entry of the database recovery log pertaining to the change of the row;

determining a type of change to the row;

extracting old column values and new column values of the row from the entry in the database recovery log; and extracting changed key column values and unchanged key column values associated with the row from the entry in the database recovery log.

8. The method of claim 7, wherein the type of change to the row comprises a row insert, a row delete, a non-key update, or a key update.

9. The method of claim 8, wherein determining that the captured change to the row of the given table copy is to be communicated to other table copies in the database system comprises:

examining the type of change to the row of the given table copy, the copy identification associated with the row of the given table copy, and the propagation controls associated with the row of the given table copy.

10. The method of claim 9, wherein determining that the captured change to the row of the given table copy is to be communicated to other table copies in the database system further comprises:

determining that the captured change to the row of the given table copy is to be communicated to other table copies in the database system responsive to:

the type of change to the row being a row insert; and the copy identification associated with the row being the same as a copy identification assigned to the given table copy.

11. The method of claim 9, wherein determining that the captured change to the row of the given table copy is to be communicated to other table copies in the database system further comprises:

determining that the captured change to the row of the given table copy is to be communicated to other table copies in the database system responsive to:

the type of change to the row being a row delete; and the delete label associated with the row indicating that the captured change is to be communicated to the other table copies in the database system.

12. The method of claim 9, wherein determining that the captured change to the row of the given table copy is to be communicated to other table copies in the database system further comprises:

determining that the captured change to the row of the given table copy is to be communicated to other table copies responsive to:

the type of change to the row being a non-key update or a key update;

neither the delete label nor the conflict label associated with the row indicates that the captured change is not to be communicated to other table copies in the database system; and a new copy identification associated with the row being the same as the copy identification assigned to the given table copy.

13. The method of claim 1, wherein communicating the captured change to the other table copies in the database system comprises:

sending information associated with the captured change to the other table copies in the database system, wherein responsive to the type of change to the row being a row insert, the information associated with the captured change comprises key column values, non-key column values, a timestamp, and a copy identification associated with the row of the given table copy.

14. The method of claim 1, wherein communicating the captured change to the other table copies in the database system comprises:

sending information associated with the captured change to the other table copies in the database system, wherein responsive to the type of change to the row being a row delete, the information associated with the captured change comprises key column values, a timestamp, and a copy identification associated with the row of the given table copy.

15. The method of claim 1, wherein communicating the captured change to the other table copies in the database system comprises:

sending information associated with the captured change to the other table copies in the database system, wherein responsive to the type of change being a non-key update, the information associated with the captured change comprises key column values, new non-key column values, an old timestamp, a new timestamp, an old copy identification, and a new copy identification associated with the row of the given table copy.

16. The method of claim 1, wherein communicating the captured change to the other table copies in the database system comprises:
  sending information associated with the captured change to the other table copies in the database system,
  wherein responsive to the type of change being a key update, the information associated with the captured change comprises old key column values, new key column values, new non-key column values, an old timestamp, a new timestamp, an old copy identification, and a new copy identification associated with the row of the given table copy.

17. The method of claim 1, wherein detecting a conflict for the communicated change with a row of a target table copy comprises:
  responsive to the type of the communicated change being a row delete, the conflict is detected responsive to:
  no row of the target table copy with key column values matching key column values associated with the communicated change is identified; or
  for a row of the target table copy with key column values matching the key column values associated with the communicated change,
    a timestamp associated with the row of the target table copy does not match the timestamp associated with the communicated change; or
    a copy identification of the row of the target table copy does not match a copy identification associated with the communicated change.

18. The method of claim 1, wherein detecting a conflict for the communicated change with a row of a target table copy further comprises:
  responsive to the type of the communicated change being a row insert, the conflict is detected responsive to:
  a row of the target table copy with key column values matching key column values associated with the communicated change is identified.

19. The method of claim 1, wherein detecting a conflict for the communicated change with a row of a target table copy further comprises:
  responsive to the type of the communicated change being a non-key update, the conflict is detected responsive to:
  no row of the target table copy with key column values matching key column values associated with the communicated change is identified; or
  for a row of the target table copy with key column values matching the key column values associated with the communicated change,
    a timestamp associated with the row of the target table copy does not match an old timestamp associated with the communicated change; or
    a copy identification of the row of the target table copy does not match an old copy identification associated with the communicated charge.

20. The method of claim 1, wherein detecting a conflict for the communicated change with a row of a target table copy further comprises:
  responsive to the type of the communicated change being a key update, the conflict is detected responsive to:
  no row of the target table copy with key column values matching old key column values associated with the communicated change is identified; or
  for a row of the target table copy with key column values matching old key column values associated with the communicated change,
    a timestamp associated with the row of the target table copy does not match an old timestamp associated with the communication change; or
    a copy identification associated with the row of the target table copy does not match an old copy identification associated with the communicated change; or
    a row of the target table copy with key column values matching new key column values associated with the communicated change is identified.

21. The method of claim 1, wherein applying the communicated change to the other table copies in the database system comprises:
  assigning priority to the communicated change responsive to no conflict being detected between the communicated change and the row of the target table copy.

22. The method of claim 1, wherein determining a priority for the communicated change comprises:
  assigning priority to the communicated change responsive to the type of the communication change being a row insert; and
    a timestamp associated with the communicated change is greater than a timestamp associated with the conflicting row in the target table copy; or
    the timestamp associated with the communicated change is equal to the timestamp associated with the conflicting row, and a copy identification associated with the communication change is greater than a copy identification associated with the conflicting row.

23. The method of claim 1, wherein determining a priority for the communicated change comprises:
  assigning priority to the communicated change responsive to the type of the communicated change being a row delete and responsive to:
  no row in the target table copy matches key column values associated with the communicated change; or
  a timestamp associated with the communicated change is greater than a timestamp associated with the conflicting row in the target table copy; or
  the timestamp associated with the communicated change is the same as the timestamp associated with the conflicting row and a copy identification associated with the communication change is greater than a copy identification associated with the conflicting row.

24. The method of claim 1, wherein determining a priority for the communicated change comprises:
  assigning priority to the communicated change responsive to the type of the communicated change being a non-key update and responsive to:
  no row in the target table copy matches key column values associated with the communicated change; or
  a timestamp associated with the communicated change is greater than a timestamp associated with the conflicting row in the target table copy; or
  the timestamp associated with the communicated change is the same as the timestamp associated with the conflicting row and a copy identification associated with the communicated change is greater than a copy identification associated with the conflicting row.

25. The method of claim 1, wherein determining a priority for the communicated change if the conflict is detected comprises:
  assigning priority to the communicated change responsive to the type of the communicated change being a key update and responsive to:
    no row in the target table copy matching old key column values associated with the communicated change is identified; and no row in the target table copy matching new key column values associated with the communicated change is identified; or a new timestamp associated with the communicated change is greater than a timestamp associated with the conflicting row in the target table copy with key column values matching new key column values associated with the communicated change; or the new timestamp and copy identification associated with the communicated change matches the timestamp and copy identification associated with the conflicting row in the target table copy with key column values matching new key column values associated with the communicated change, respectively; or an old timestamp associated with the communicated change is greater than the timestamp associated with the conflicting row in the target table copy with key columns matching old key column values associated with the communicated change; or the timestamp associated with the communicated change matches the timestamp associated with the conflicting row and an old copy identification associated with the communicated change is greater than the copy identification associated with the conflicting row with key column values matching old key column values associated with the communicated change; and no row in the target table copy matching new key column values associated with the communicated change is identified; or the new timestamp associated with the communicated change is greater than the timestamp associated with the conflicting row with key column values matching the new key column values associated with the communicated change; or the timestamp associated with the communicated change matches the timestamp associated with the conflicting row and the new copy identification associated with the communicated change is greater than the copy identification associated with the conflicting row with key column values matching the new key column values associated with the communicated change.

26. The method of claim 1, wherein controlling propagation of the change applied to the target table copy comprises:
responsive to the type of the communicated change being a row insert, setting a copy identification associated with the applied change to the target table copy to a copy identification associated with the communicated change.

27. The method of claim 1, wherein controlling propagation of the change applied to the target table copy comprises:
responsive to the type of the communicated change being a row delete, updating a row of the target table copy with key column values matching key column values associated with the communicated change by setting the delete label to indicate not to propagate the applied change.

28. The method of claim 1, wherein controlling propagation of the change applied to the target table copy comprises:
responsive to the communicated change being a non-key or key update, setting a copy identification associated with the applied change to the target table copy to the copy identification associated with the communicated change.

29. The method of claim 1, wherein insuring convergence of each table copy in the database system to the same state comprises:

insuring propagation of an implicit delete change in the target table copy by setting a conflict label of the propagation controls associated with the conflicting row when the type of the communicated change is a row insert, row delete, or non-key update assigned priority, and a copy identification associated with the conflicting row is a copy identification assigned to the target table copy.

30. The method of claim 1, wherein insuring convergence of each table copy in the database system to the same state comprises:

insuring propagation of a delete change in the target table by setting a conflict label of the propagation controls associated with the conflicting row with key column values matching old key column values associated with the communicated change, when the type of the communicated change is a key update assigned priority, and a copy identification associated with the conflicting row matches a copy identification assigned to the target table copy; and insuring propagation of a delete change in the target table copy by setting a conflict label of the propagation controls associated with the conflicting row with key column values matching new key column values associated with the communicated change, when the type of the communicated change is a key update assigned priority, and a copy identification associated with the conflicting row is a copy identification assigned to the target table copy.

31. The method of claim 1, wherein insuring convergence of each table copy in the database system to the same state comprises:

recording communicated old key column values, an old timestamp, and an old copy identification associated with a conflicting change in the target table copy in a delete tombstone, when the type of the communicated change is a conflicting delete or a conflicting update with conflicting communicated old timestamp or copy identification.

32. The method of claim 1, wherein insuring convergence of each table copy in the database system to the same state comprises:

checking for matching delete and suppressing application of the communication change responsive to a delete tombstone matching the new key columns, new timestamp, and new copy identification associated with the communicated change being found, when the type of the communicated change is an insert change or an update change with a conflicting insert assigned priority.

33. The method of claim 1, further comprising:
reporting each conflicting change.

34. The method of claim 33, wherein reporting each conflicting change comprises:
reporting conflicting changes of a row delete, a row insert, or a non-key update change only when priority is not assigned to the communicated change and a copy identification associated with a conflicting row in a target table copy is the copy identification assigned to the target table copy.

35. The method of claim 33, wherein reporting each conflicting change comprises:
reporting conflicting changes of a key update change only when priority is not assigned to the communicated change; and
a copy identification associated with a conflicting row in a target table copy with key column values matching old key column values associated with the communicated change is the copy identification assigned to the target table copy; or a copy identification associated with a conflicting row with key column values matching new key column values associated with the communicated change is the copy identification assigned to the target table copy.

36. A database system, comprising:
a plurality of nodes, each node having a corresponding copy of a table, wherein each row of each table copy includes,
  a timestamp stored in the table copy with the row, indicating a time when a change to the row has occurred;
  a copy identification stored in the table copy with the row, the copy identification being an identifier that uniquely identifies the table copy to which the row belongs; and
  propagation controls stored in the table copy with the row, indicating whether a change to the row should be communicated to other table copies based at least in part on the timestamp of the change or the copy identification associated with the row, wherein the propagation controls comprise a delete label and a conflict label, wherein the delete label indicates that a row delete in a given table copy is not to be communicated to other table copies in the database system;
a mechanism to asynchronously capture a change to a row of a given table copy in the database system from a database recovery log, the database recovery log containing an entry that describes the change to the row of the given table copy;
a mechanism to determine that the captured change to the row of the given table copy is to be communicated to other table copies in the database system, the determination being made in accordance with the indication of the propagation controls associated with the changed row of the given table copy;
a message queue for communicating the captured change to other table copies in the database system; and
a mechanism to apply the communicated change to the other table copies in the database system, wherein each table copy in the database system converges to a same state, wherein to apply the communicated change includes to:
  detect a conflict for the communicated change with a row of a target table copy, the target table copy being a table copy among the other table copies in the database system at which changes are to be replicated;
  determine a priority for the communicated change responsive to the conflict being detected; and
  change the row of the target table copy in accordance with the detected conflict and the determined priority for the communicated change by controlling propagation of the change applied to the target table copy, by insuring convergence of each table copy in the database system to the same state, and by installing the communicated change into the target table copy.

37. The database system of claim 36, wherein the timestamp comprises a monotonic number having a non-decreasing time value, wherein the time values for each table copy are in a common time base.

38. The database system of claim 37, wherein the timestamp is associated and stored with the row in response to a user induced change of the row.

39. The database system of claim 36, wherein the copy identification assigned to each table copy has an ordering property.

40. The database system of claim 36, wherein the copy identification of a given row is associated with the row in response to a user induced change of the row.

41. The database system of claim 36, wherein the conflict label indicates that an implicit row delete in a given table copy is to be communicated to other table copies in the database system, an implicit row delete being a deletion of a row due to a conflict.

42. A non-transitory computer readable medium with program instructions tangibly stored thereon for providing convergence of multiple copies of a table to a same state in a database system, the database system including a plurality of nodes each having a corresponding copy of the table, the computer readable medium comprising instructions for:
  for each row of each table copy,
    associating and storing a timestamp in the table copy with the row, the timestamp indicating a time when a change to the row has occurred;
    associating and storing a copy identification in the table copy with the row, the copy identification being an identifier that uniquely identifies the table copy to which the row belongs; and
    associating and storing propagation controls in the table copy with the row, the propagation controls indicating whether a change to the row should be communicated to other table copies based at least in part on the timestamp of the change or the copy identification associated with the row, wherein the propagation controls comprise a delete label and a conflict label, wherein the delete label indicates that a row delete in a given table copy is not to be communicated to other table copies in the database system;
  asynchronously capturing a change to a row of a given table copy from a database recovery log, the database recovery log containing an entry that describes the change to the row of the given table copy;
  determining that the captured change to the row of the given table copy is to be communicated to other table copies in the database system, the determination being made in accordance with the indication of the propagation controls associated with the changed row of the given table copy;
  communicating the captured change to the other table copies in the database system; and
  applying the communicated change to the other table copies in the database system, wherein each table copy in the database system converges to a same state, wherein applying the communicated change includes:
    detecting a conflict for the communicated change with a row of a target table copy, the target table copy being a table copy among the other table copies in the database system at which changes are to be replicated;
    determining a priority for the communicated change responsive to the conflict being detected; and
    changing the row of the target table copy in accordance with the detected conflict and the determined priority for the communicated change by controlling propagation of the change applied to the target table copy, by insuring convergence of each table copy in the database system to the same state, and by installing the communicated change into the target table copy.

43. The non-transitory computer readable medium of claim 42, wherein timestamp comprises a monotonic number having a non-decreasing time value, wherein the time values for each table copy are in a common time base.

44. The non-transitory computer readable medium of claim 43, wherein the instructions for associating and storing a timestamp with the row include instructions for associating and storing the timestamp with the row in response to a user induced change of the row.

45. The non-transitory computer readable medium of claim 42, wherein the copy identification uniquely identifying each table copy has an ordering property.

46. The non-transitory computer readable medium of claim 45, wherein the instructions for associating and storing a copy identification with the row include instructions for associating and storing the copy identification with the row in response to a user induced change of the row.

47. The non-transitory computer readable medium of claim 42, wherein the conflict label indicates that an implicit row delete in a given table copy is to be communicated to other table copies in the database system, an implicit row delete being a deletion of a row due to a conflict.

48. The non-transitory computer readable medium of claim 42, wherein the instructions for asynchronously capturing a change to a row of a given table copy include instructions for:
  accessing the entry of the database recovery log pertaining to the change of the row;
  determining a type of change to the row;
  extracting old column values and new column values of the row from the entry in the database recovery log; and
  extracting changed key column values and unchanged key column values associated with the row from the entry in the database recovery log.

49. The non-transitory computer readable medium of claim 48, wherein the type of change to the row comprises a row insert, a row delete, a non-key update, or a key update.

50. The non-transitory computer readable medium of claim 49, wherein the instructions for determining that the captured change to the row of the given table copy is to be communicated to other table copies in the database system include instructions for:
  examining the type of change to the row of the given table copy, the copy identification associated with the row of the given table copy, and the propagation controls associated with the row of the given table copy.

51. The non-transitory computer readable medium of claim 50, wherein the instructions for determining that the captured change to the row of the given table copy is to be communicated to other table copies in the database system further include instructions for:
  determining that the captured change to the row of the given table copy is to be communicated to other table copies in the database system responsive to:
    the type of change to the row being a row insert; and
    the copy identification associated with the row being the same as a copy identification assigned to the given table copy.

52. The non-transitory computer readable medium of claim 50, wherein the instructions for determining that the captured change to the row of the given table copy is to be communicated to other table copies in the database system further include instructions for:
  determining that the captured change to the row of the given table copy is to be communicated to other table copies in the database system responsive to:
    the type of change to the row being a row delete; and
    the delete label associated with the row indicating that the captured change is to be communicated to the other table copies in the database system.

53. The non-transitory computer readable medium of claim 50, wherein the instructions for determining that the captured change to the row of the given table copy is to be communicated to other table copies in the database system further include instructions for:
  determining that the captured change to the row of the given table copy is to be communicated to other table copies in the database system responsive to:
    the type of change to the row being a non-key update or a key update; and
    neither the delete label nor the conflict label associated with the row indicates that the captured change is not to be communicated to other table copies in the database system; and
    a new copy identification associated with the row is the same as the copy identification assigned to the given table copy.

54. The non-transitory computer readable medium of claim 42, wherein the instructions for communicating the captured change to the other table copies in the database system include instructions for:
  sending information for the captured change to the others of the plurality of table copies,
  wherein responsive to the captured change being a row insert, the information comprises key column values, non-key column values, a monotonic number, and a copy identification of the captured change.

55. The non-transitory computer readable medium of claim 42, wherein the instructions for communicating the captured change to the other table copies in the database system include instructions for:
  sending information for the captured change to the others of the plurality of table copies,
  wherein responsive to the captured change being a row delete, the information comprises key column values, a monotonic number, and a copy identification of the captured change.

56. The non-transitory computer readable medium of claim 42, wherein the instructions for communicating the captured change to the other table copies in the database system include instructions for:
  sending information for the captured change to the others of the plurality of table copies,
  wherein responsive to the captured change being a non-key update, the information comprises key column values, new non-key column values, an old monotonic number, a new monotonic number, an old copy identification, and a new copy identification of the captured change.

57. The non-transitory computer readable medium of claim 42, wherein the instructions for communicating the captured change to the other table copies in the database system include instructions for:
  sending information associated with the captured change to other table copies in the database system,
  wherein responsive to the type of change to the row being a key update, the information associated with the captured change comprises old key column values, new key column values, new non-key column values, an old timestamp, a new timestamp, an old copy identification, and a new copy identification associated with the row of the given table copy.

58. The non-transitory computer readable medium of claim 42, wherein the instructions for detecting a conflict for the communicated change with a row of a target table copy include instructions for:
  responsive to the type of the communicated change being a row delete, the conflict is detected responsive to:

no row of the target table copy with key column values matching key column values associated with the communicated change is identified; or for a row of the target table copy with key column values matching the key column values associated with the communicated change, a timestamp associated with the row of the target table copy does not match the timestamp associated with the communicated change; or a copy identification of the row of the target table copy does not match a copy identification associated with the communicated change.

59. The non-transitory computer readable medium of claim 42, wherein the instructions for detecting a conflict for the communicated change with a row of a target table copy further include instructions for:

responsive to the type of the communicated change being a row insert, the conflict is detected responsive to a row of the target table copy with key column values matching key column values associated with the communicated change being identified.

60. The non-transitory computer readable medium of claim 42, wherein the instructions for detecting a conflict for the communicated change with a row of a target table copy further include instructions for:

responsive to the type of the communicated change being a non-key update, the conflict is detected responsive to:

no rows of the target table copy with key column values matching key column values associated with the communicated change is identified; or for a row of the target table copy with key column values matching the key column values associated with the communicated change, a timestamp associated with the row of the target table copy does not match an old timestamp associated with the communicated change; or a copy identification of the row of the target table copy does not match an old copy identification associated with the communicated charge.

61. The non-transitory computer readable medium of claim 42, wherein the instructions for detecting a conflict for the communicated change with a row of a target table copy further include instructions for:

responsive to the type of the communicated change being a key update, the conflict is detected responsive to:

no row of the target table copy with key column values matching old key column values associated with the communicated change is identified; or for a row of the target table copy with key column values matching old key column values associated with the communicated change, a timestamp associated with the row of the target table copy does not match an old timestamp associated with the communication change; or a copy identification associated with the row of the target table copy does not match an old copy identification associated with the communicated change; or a row of the target table copy with key column values matching new key column values associated with the communicated change is identified.

62. The non-transitory computer readable medium of claim 42, wherein the instructions for applying the communicated change to the other table copies in the database system include instructions for:

assigning priority to the communicated change responsive to no conflict being detected between the communicated change and the row of the target table copy.

63. The non-transitory computer readable medium of claim 42, wherein the instructions for determining a priority for the communicated change include instructions for:

assigning priority to the communicated change responsive to the type of the communication change being a row insert; and a timestamp associated with the communicated change is greater than a timestamp associated with the conflicting row in the target table copy; or the timestamp associated with the communicated change is equal to the timestamp associated with the conflicting row; and a copy identification associated with the communication change is greater than a copy identification associated with the conflicting row.

64. The non-transitory computer readable medium of claim 42, wherein the instructions for determining a priority for the communicated change include instructions for:

assigning priority to the communicated change responsive to the type of the communicated change being a row delete and responsive to:

no row in the target table copy matches key column values associated with the communicated change; or a monotonic timestamp associated with the communicated change is greater than a timestamp associated with the conflicting row in the target table copy; or the timestamp associated with the communicated change is the same as the timestamp associated with the conflicting row and a copy identification associated with the communication change is greater than a copy identification associated with the conflicting row.

65. The non-transitory computer readable medium of claim 42, wherein the instructions for determining a priority for the communicated change include instructions for:

assigning priority to the communicated change responsive to the type of the communicated change being a non-key update and responsive to:

no row in the target table copy matches key column values associated with the communicated change; or a timestamp associated with the communicated change is greater than a timestamp associated with the conflicting row in the target table copy; or the monotonic timestamp associated with the communicated change is the same as the timestamp associated with the conflicting row and a copy identification associated with the communicated change is greater than a copy identification associated with the conflicting row.

66. The non-transitory computer readable medium of claim 42, wherein the instructions for determining a priority for the communicated change include instructions for:

assigning priority to the communicated change responsive to the type of the communicated change being a key update and responsive to:

no row in the target table copy matching old key column values associated with the communicated change is identified; and no row in the target table copy matching new key column values associated with the communicated change is identified; or a new timestamp associated with the communicated change is greater than a timestamp associated with the conflicting row in the target table copy with key column values matching new key column values associated with the communicated change; or the new timestamp and a copy identification associated with the communicated change matches the timestamp and copy identification associated with the conflicting row in the target table copy with key column values matching new key column values associated with the communicated change, respectively; or an old timestamp associated with the communicated change is greater than the timestamp associated with the conflicting row in the target table copy with key columns matching old key column values associated with the communicated change; or the timestamp associated with the communicated change matches the timestamp associated with the conflicting row and an old copy identification associated with the communicated change is greater than the copy identification associated with the conflicting row with key column values matching old key column values associated with the communicated change; and no row in the target table copy matching new key column values associated with the communicated change is identified; or the new timestamp associated with the communicated change is greater than the timestamp associated with the conflicting row with key column values matching the new key column values associated with the communicated change; or the timestamp associated with the communicated change matches the timestamp associated with the conflicting row and the new copy identification associated with the communicated change is greater than the copy identification associated with the conflicting row with key column values matching the new key column values associated with the communicated change.

67. The non-transitory computer readable medium of claim 42, wherein the instructions for controlling propagation of the change applied to the target table copy include instructions for:
responsive to the type of the communicated change being a row insert, setting a copy identification associated with the applied change to the target table copy to a copy identification associated with the communicated change.

68. The non-transitory computer readable medium of claim 42, wherein the instructions for controlling propagation of the change applied to the target table copy include instructions for:
responsive to the type of the communicated change being a row delete, updating a row of the target table copy with key column values matching key column values associated with the communicated change by setting the delete label to indicate not to propagate the applied change.

69. The non-transitory computer readable medium of claim 42, wherein the instructions for controlling propagation of the change applied to the target table copy include instructions for:
responsive to the type of the communicated change being a non-key or key update, setting a copy identification of the applied change to the target table copy to the copy identification received with the communicated change.

70. The non-transitory computer readable medium of claim 42, wherein the instructions for insuring convergence of each table copy in the database system to the same state include instructions for:
insuring propagation of an implicit delete change in the target table copy by setting a conflict label of the propagation controls associated with the conflicting row when the type of the communicated change is a row insert, a row delete, or a non-key update assigned priority and a copy identification associated with the conflicting row is a copy identification assigned to the target table copy.

71. The non-transitory computer readable medium of claim 42, wherein the instructions for insuring convergence of each table copy in the database system to the same state include instructions for:
insuring propagation of a delete change in the target table by setting a conflict label of the propagation controls associated with the conflicting row with key column values matching old key column values associated with the communicated change, when the type of the communicated change is a key update assigned priority and a copy identification associated with the conflicting row matches a copy identification assigned to the target table copy.

72. The non-transitory computer readable medium of claim 42, wherein the instructions for insuring convergence of each table copy in the database system to the same state include instructions for:
recording communicated old key column values, an old timestamp, and an old copy identification associated with a conflicting change in the target table copy in a delete tombstone, when the type of the communicated change is a conflicting delete or a conflicting update with conflicting communicated old timestamp or copy identification.

73. The non-transitory computer readable medium of claim 42, wherein the instructions for insuring convergence of each table copy in the database system to the same state include instructions for:
checking for matching delete and suppressing application of the communication change responsive to a delete tombstone matching new key column values, new timestamp, and new copy identification associated with the communicated change is found, when the type of the communicated change is an insert change or an update change with a conflicting insert assigned priority.

74. The non-transitory computer readable medium of claim 42, further comprising instructions for:
reporting each conflicting change.

75. The non-transitory computer readable medium of claim 74, wherein the instructions for reporting each conflicting change include instructions for:
reporting conflicting changes of a row delete, a row insert, or a non-key update change only when priority is not assigned to the communicated change and a copy identification associated with a conflicting row in a target table copy is the copy identification assigned to the target table copy.

76. The non-transitory computer readable medium of claim 74, wherein the instructions for reporting each conflicting change include instructions for:
reporting conflicting changes of a key update change only when priority is not assigned to the communicated change; and
a copy identification associated with a conflicting row in a target table copy with key column values matching old key column values associated with the communicated change is the copy identification assigned to the target table copy; or
a copy identification associated with a conflicting row with key column values matching new key column values associated with the communicated change is the copy identification assigned to the target table copy.

* * * * *